US010110072B2

(12) United States Patent
Kato et al.

(10) Patent No.: US 10,110,072 B2
(45) Date of Patent: Oct. 23, 2018

(54) PORTABLE DEVICE AND PORTABLE TIMEPIECE

(71) Applicant: Seiko Instruments Inc., Chiba-shi, Chiba (JP)

(72) Inventors: Teruo Kato, Chiba (JP); Yasunori Hara, Chiba (JP); Tamotsu Maesawa, Chiba (JP); Dai Terasawa, Chiba (JP); Hideki Okuda, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 0 days.

(21) Appl. No.: 15/450,589

(22) Filed: Mar. 6, 2017

(65) Prior Publication Data

US 2017/0261942 A1 Sep. 14, 2017

(30) Foreign Application Priority Data

Mar. 8, 2016 (JP) ................................. 2016-044681

(51) Int. Cl.

| G04G 19/00 | (2006.01) |
| H02J 50/50 | (2016.01) |
| G04B 37/14 | (2006.01) |
| H02J 7/02 | (2016.01) |

(52) U.S. Cl.
CPC .......... *H02J 50/50* (2016.02); *G04B 37/1486* (2013.01); *G04G 19/00* (2013.01); *H02J 7/025* (2013.01)

(58) Field of Classification Search
CPC ....................................................... H02J 50/50
See application file for complete search history.

(56) References Cited

U.S. PATENT DOCUMENTS

| 9,231,665 B2 * | 1/2016 | Liao ...................... H04B 5/0037 |
| 2013/0241309 A1 * | 9/2013 | Arnold .................... H02J 5/005 |
| | | 307/104 |
| 2017/0040825 A1 * | 2/2017 | Cavallaro ............... H02J 7/025 |

FOREIGN PATENT DOCUMENTS

| JP | WO 9963557 A1 * | 12/1999 | ......... H01F 17/0006 |
| JP | 2011-160501 A | 8/2011 | |

* cited by examiner

*Primary Examiner* — Daniel Cavallari
(74) *Attorney, Agent, or Firm* — Brinks Gilson & Lione

(57) ABSTRACT

A portable timepiece includes a case, a power receiving coil accommodated on a rear surface side in the case, a bypass member configured to include a soft magnetic material, and a first band that is attached to the case, that is internally equipped with the bypass member, and that enables the bypass member to be disposed between the power receiving coil and a charging device when charging is performed using the charging device.

14 Claims, 13 Drawing Sheets

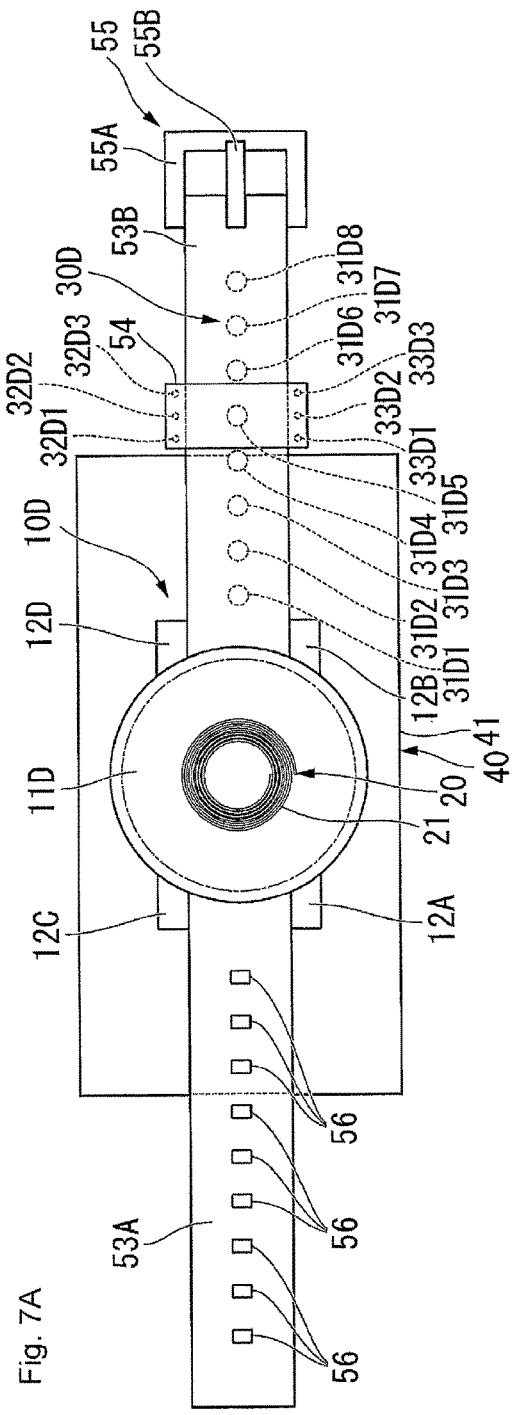
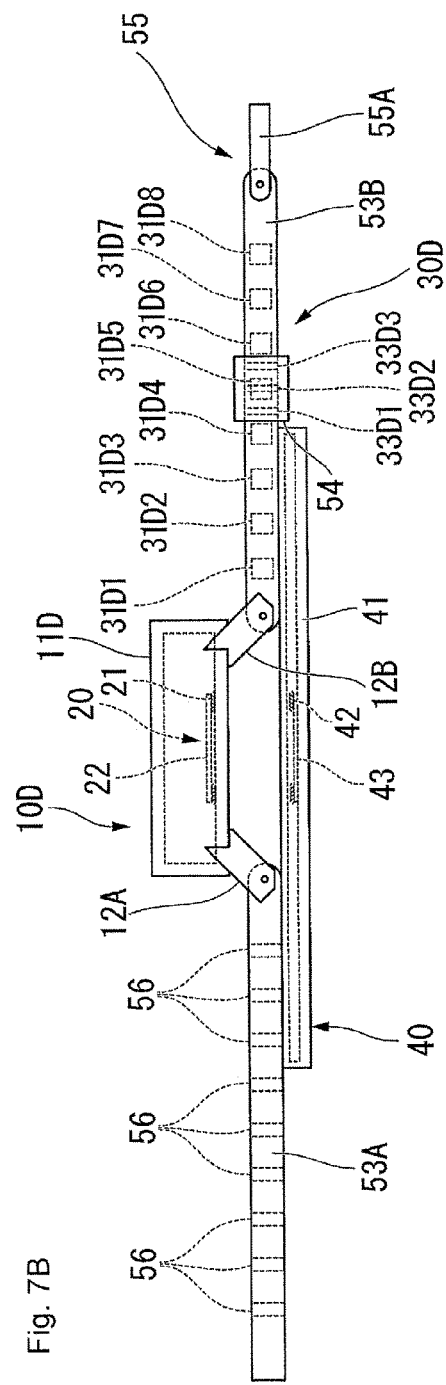
Fig. 7A
Fig. 7B

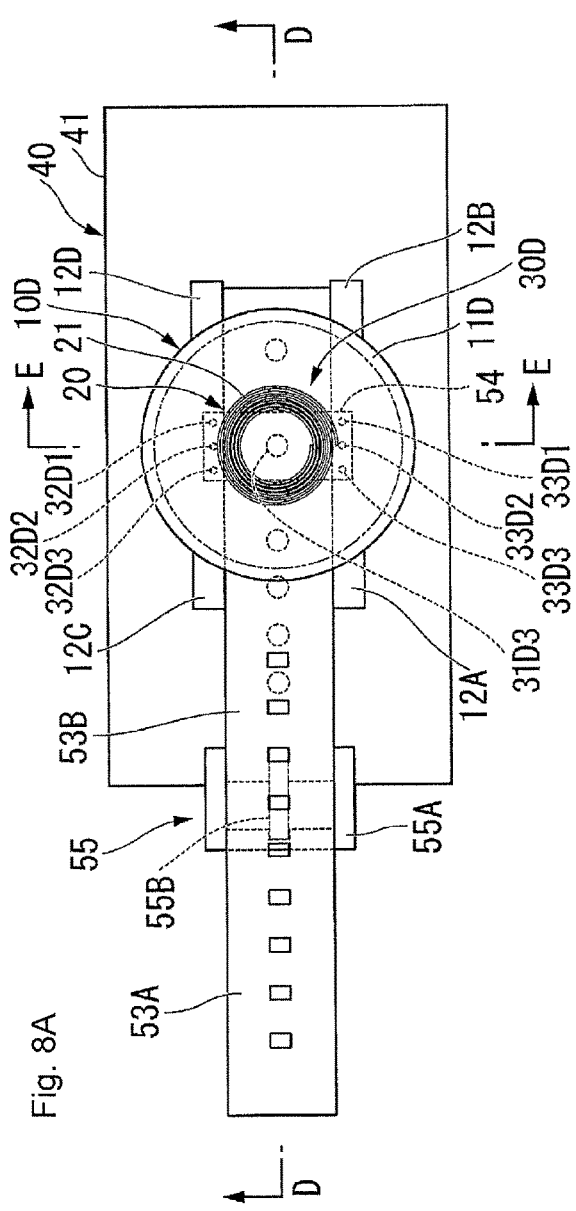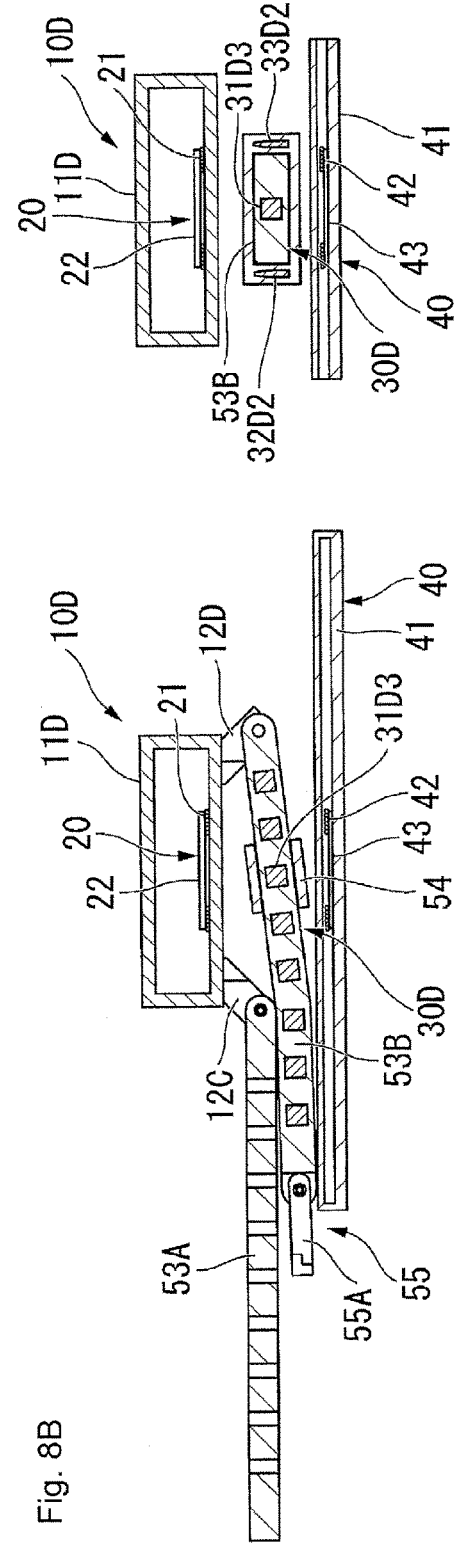

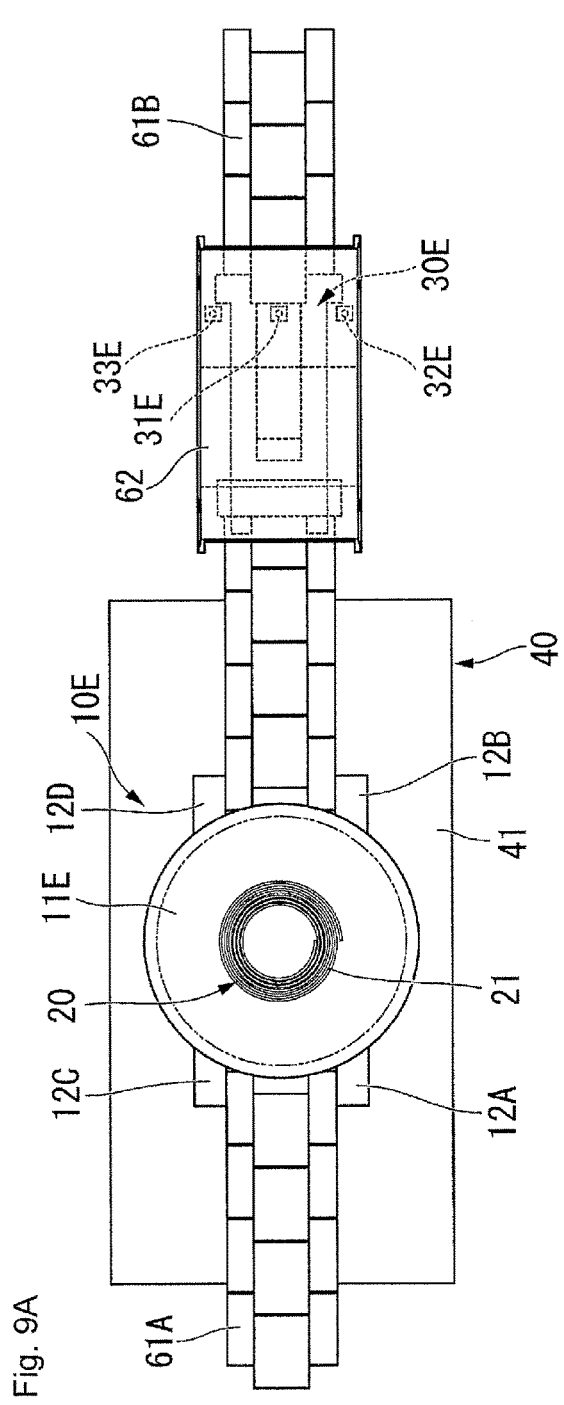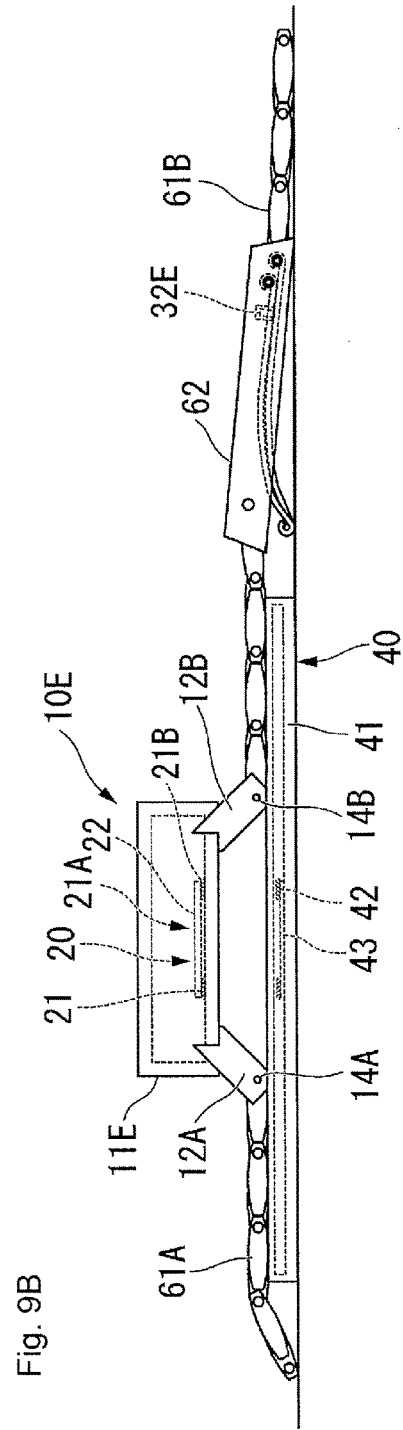

PORTABLE DEVICE AND PORTABLE TIMEPIECE

RELATED APPLICATIONS

This application claims priority under 35 U.S.C. § 119 to Japanese Patent Application No. 2016-044681 filed on Mar. 8, 2016, the entire content of which is hereby incorporated by reference.

BACKGROUND OF THE INVENTION

Field of the Invention

The present invention relates to a portable device and a portable timepiece.

Background Art

In a portable timepiece such as a wristwatch and a pocket watch or a portable device such as a stopwatch, a cellular phone, and a portable information terminal, a non-contact charging method has been widely introduced in which a charger is not directly connected by a wire and electromagnetic induction is alternatively utilized, for example. The non-contact charging method employs a power supply coil disposed in the charger for non-contact charging and a power receiving coil disposed inside a housing of the portable device.

For example, the charger used for the non-contact charging method in this way includes the power supply coil and a cover plate. For example, the portable device has the power receiving coil incorporated inside the housing. If the portable device is brought close to the cover plate in a state where electricity is supplied to the power supply coil of the charger, the electromagnetic induction is generated between the power supply coil and the power receiving coil, thereby generating power (induced electromotive force) on the power receiving coil side. In the portable device, a storage battery incorporated in the portable device is charged with the power generated in the power receiving coil.

In order to perform charging by using the non-contact charging method, it is preferable to bring the power supply coil and the power receiving coil close to each other. In the related art, JP-A-2011-160501 discloses an electronic device (charger) having improved charging efficiency. The electronic device includes a second coil (power supply coil). The second coil is magnetically coupled with a first coil (power receiving coil) disposed in a band portion extending in a horizontal direction of a timepiece main body of a wristwatch (portable device). The electronic device includes a positioning recess for positioning the band portion of the wristwatch. In order to charge a capacitor disposed in the wristwatch, the band portion is positioned in the positioning recess, and the charging is performed in a state where the first coil and the second coil are brought close to each other.

Incidentally, in recent years, the charger has been installed in a place other than a fixed charging place such as a user's house, and various types have been installed as the charger. Therefore, it is necessary to provide a portable device whose charging efficiency can be improved even if the portable device is charged using various chargers. However, according to the electronic device disclosed in JP-A-2011-160501, the capacitor of the wristwatch is charged after the band attached to the wristwatch is positioned in the positioning recess in the electronic device. Therefore, in order to efficiently charge the capacitor, it is necessary to use the electronic device corresponding to the wristwatch. Accordingly, in a case where various chargers are used for the wristwatch, it is difficult to bring the power receiving coil and the power supply coil close to each other, and it is difficult to improve the charging efficiency.

SUMMARY OF THE INVENTION

Therefore, an advantage of some aspects of the present invention is to provide a portable device and a portable timepiece which can improve charging efficiency in non-contact charging, even in a case where the charging is performed using various chargers.

According to an aspect of the present invention, a portable device includes a case, a power receiving unit accommodated in the case, a bypass member configured to include a soft magnetic material, and an accessory member that is disposed in the case, that is internally equipped with the bypass member, and that enables the bypass member to be disposed between the power receiving unit and a charging device when charging is performed using the charging device.

The soft magnetic material included in the bypass member has a weak coercive force and high magnetic permeability. Therefore, if the bypass member is disposed between the power receiving unit and the charging device, electromagnetic induction is strengthened when power is supplied to the charging device. Accordingly, it is possible to increase an induced electromotive force generated in the power receiving unit. Thus, since the bypass member is disposed between the power receiving unit and the charging device, charging efficiency can be improved. The bypass member is disposed in the accessory member that enables the bypass member to be disposed between the power receiving unit and the charging device. Therefore, even in a case where various chargers are used, the bypass member can be disposed between the power receiving unit and the charging device. Accordingly, even in a case where charging is performed using various chargers, the charging efficiency can be improved in non-contact charging.

In the above-described portable device, the power receiving unit may include a power receiving coil that is disposed on a surface along a facing surface which faces the charging device in the case, and that has an opening portion formed in the center. When the charging is performed using the charging device, the accessory member may enable the bypass member to be disposed at a position where the bypass member and the power receiving unit do not overlap each other when viewed in an axial direction orthogonal to the facing surface.

According to the above-described portable device, the bypass member can be disposed at the position where the bypass member and the power receiving unit do not overlap each other during a charging period. Since the bypass member can be disposed at the position where the bypass member and the power receiving unit do not overlap each other during the charging period, it is possible to further strengthen the electromagnetic induction between the power receiving unit and the charging device. Accordingly, the charging efficiency can be further improved in the non-contact charging.

In the above-described portable device, the accessory member may enable the bypass member to be disposed in the opening portion formed in the center of the power receiving coil and an outer edge portion of the power receiving coil.

According to the above-described portable device, the bypass member can be disposed in the opening portion formed in the center of the power receiving coil and the outer edge portion of the power receiving coil during a charging period. Since the bypass member is disposed in the opening portion formed in the center of the power receiving coil and the outer edge portion of the power receiving coil, it is possible to further strengthen the electromagnetic induction between the power receiving unit and the charging device. Accordingly, the charging efficiency can be further improved in the non-contact charging.

According to another aspect of the present invention, a portable timepiece includes a timepiece main body, a power receiving unit accommodated on a rear surface side in the timepiece main body, a bypass member configured to include a soft magnetic material, and an accessory member that is attached to the timepiece main body, that is internally equipped with the bypass member, and that enables the bypass member to be disposed between the power receiving unit and a charging device when charging is performed using the charging device.

According to the above-described portable timepiece, since the bypass member including the soft magnetic material is disposed between the power receiving unit and the charging device, the charging efficiency can be improved. The bypass member is disposed in the accessory member that enables the bypass member to be disposed between the power receiving unit and the charging device. Therefore, even in a case where various chargers are used, the bypass member can be disposed between the power receiving unit and the charging device. Accordingly, even in a case where charging is performed using various chargers, the charging efficiency can be improved in the non-contact charging.

In the above-described portable timepiece, the accessory member may be a band that is folded so as to enable the bypass member to be disposed between the power receiving unit and the charging device when the charging is performed using the charging device.

According to the above-described portable timepiece, the band attached to the timepiece main body is internally equipped with the bypass member. Therefore, the bypass member can be easily disposed between the power receiving unit and the charging device.

In the above-described portable timepiece, the accessory member may be a pulling band that is pulled to a rear surface side in the timepiece main body, and that is internally equipped with the bypass member on a rear side of the timepiece main body.

According to the above-described portable timepiece, the pulling band attached to the timepiece main body is internally equipped with the bypass member. Therefore, the bypass member can be easily disposed between the power receiving unit and the charging device.

In the above-described portable timepiece, the accessory member may be a jacket band including a main body accommodation unit that accommodates the timepiece main body and that is internally equipped with the bypass member, and an accessory band that is disposed in the main body accommodation unit.

According to the above-described portable timepiece, the jacket band includes the main body accommodation unit that is internally equipped with the bypass member, and the accessory band that is disposed in the main body accommodation unit. Therefore, the bypass member can be easily disposed between the power receiving unit and the charging device.

In the above-described portable timepiece, the accessory member may be a free ring attached to a band so as to be movable along the band attached to the timepiece main body.

According to the above-described portable timepiece, the free ring attached to the band so as to be movable along the band attached to the timepiece main body is internally equipped with the bypass member. Therefore, the bypass member can be easily disposed between the power receiving unit and the charging device.

In the above-described portable timepiece, the accessory member may be a clasp that is disposed in a connection band attached to the timepiece main body, and that connects the connection band to a connection target band attached to the timepiece main body.

According to the above-described portable timepiece, the clasp that connects the connection band to the connection target band is internally equipped with the bypass member. Therefore, the bypass member can be easily disposed between the power receiving unit and the charging device.

In the above-described portable timepiece, the accessory member may be a block connection band in which multiple band blocks are connected to each other and the band block is internally equipped with the bypass member.

According to the above-described portable timepiece, the band block in the block connection band is internally equipped with the bypass member. Therefore, the bypass member can be easily disposed between the power receiving unit and the charging device.

In the above-described portable timepiece, the accessory member may be a bow disposed in the timepiece main body.

According to the above-described portable timepiece, the bow disposed in the timepiece main body is internally equipped with the bypass member. Therefore, the bypass member can be easily disposed between the power receiving unit and the charging device.

In the above-described portable timepiece, the accessory member may be a case back that closes an opening on a rear surface side of the timepiece main body.

According to the above-described portable timepiece, the case back that closes the opening on the rear side of the timepiece main body is internally equipped with the bypass member. Therefore, the bypass member can be easily disposed between the power receiving unit and the charging device.

In the above-described portable timepiece, the accessory member may be a decorative member that is attachable to and detachable from each of a rear surface side of the timepiece main body and a portion of the timepiece main body, which excludes the rear surface side.

According to the above-described portable timepiece, the decorative member that is attachable to and detachable from each of the rear surface side of the timepiece main body and the portion of the timepiece main body, which excludes the rear surface side, is internally equipped with the bypass member. Therefore, the bypass member can be easily disposed between the power receiving unit and the charging device.

In the above-described portable timepiece, the power receiving unit may include a power receiving coil that is disposed on a surface along a facing surface which faces the charging device in the timepiece main body, and that has an opening portion formed in the center. When the charging is performed using the charging device, the accessory member may enable the bypass member to be disposed at a position where the bypass member and the power receiving unit do not overlap each other when viewed in an axial direction orthogonal to the facing surface.

According to the above-described portable timepiece, the bypass member can be disposed at the position where the bypass member and the power receiving unit do not overlap each other during a charging period. Therefore, the charging efficiency can be further improved in the non-contact charging.

In the above-described portable timepiece, the accessory member may enable the bypass member to be disposed in the opening portion formed in the center of the power receiving coil and an outer edge portion of the power receiving coil.

According to the above-described portable timepiece, the bypass member can be disposed in the opening portion formed in the center of the power receiving coil and the outer edge portion of the power receiving coil during a charging period. Therefore, the charging efficiency can be further improved in the non-contact charging.

According to a portable device and a portable timepiece in the present invention, even in a case where charging is performed using various chargers, charging efficiency can be improved in non-contact charging.

BRIEF DESCRIPTION OF THE DRAWINGS

FIG. 7A is a plan view of a portable timepiece according to a fourth embodiment, and FIG. 7B is a side view of the portable timepiece according to the fourth embodiment.

FIG. 8A is a plan view during a charging period of a portable timepiece according to the fourth embodiment, FIG. 8B is a sectional view taken along line D-D in FIG. 8A, and FIG. 8C is a sectional view taken along line E-E in FIG. 8A.

FIG. 9A is a plan view of a portable timepiece according to a fifth embodiment, and FIG. 9B is a side view of the portable timepiece according to the fifth embodiment.

DETAILED DESCRIPTION OF THE INVENTION

Figure 1:
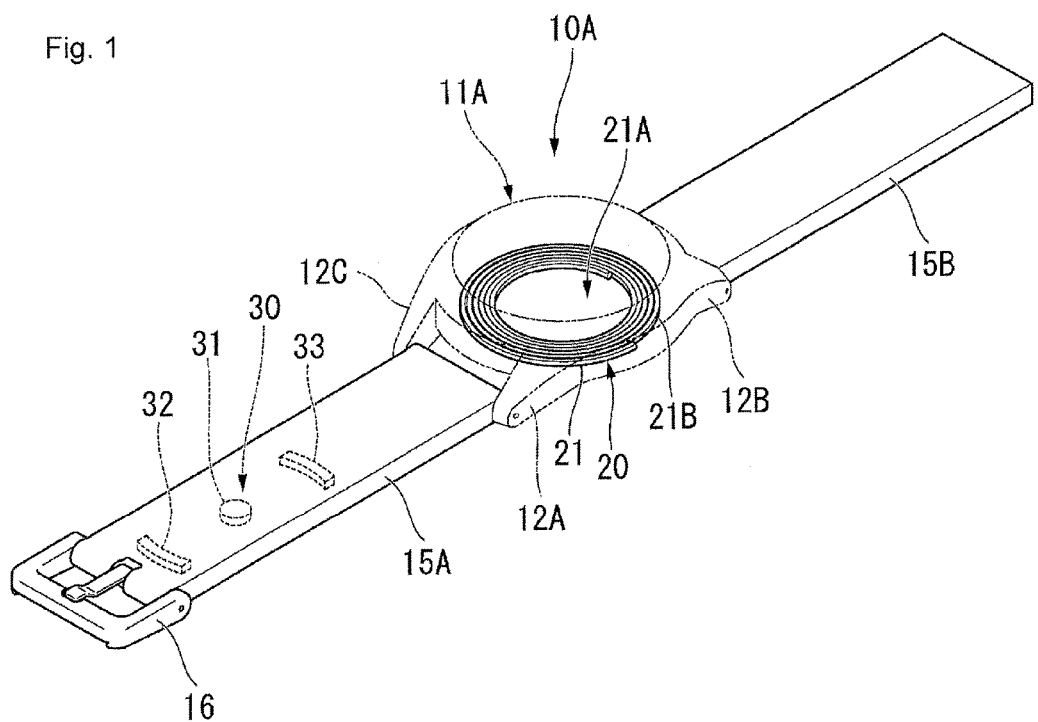
FIG. 1 is a perspective view of a portable timepiece according to a first embodiment.

Next, embodiments according to the present invention will be described with reference to the drawings. In the following description of each embodiment, the same reference numerals will be given to those which have a common function, and description thereof will be omitted.

First Embodiment

Figure 2:
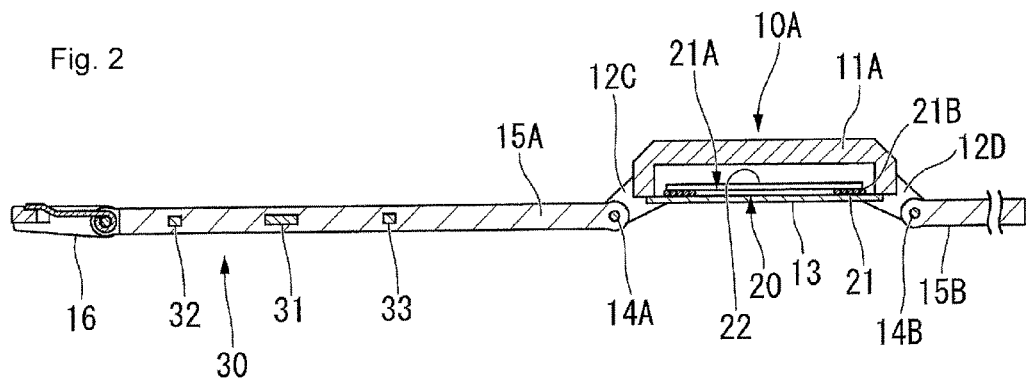
FIG. 2 is a side sectional view of the portable timepiece according to the first embodiment.

First, a first embodiment according to the present invention will be described.
1-1. Configuration of Portable Timepiece FIG. 1 is a perspective view of a portable timepiece according to the first embodiment. FIG. 2 is a side sectional view of the portable timepiece according to the first embodiment. As illustrated in FIGS. 1 and 2, a portable timepiece 10A serving as an example of a portable device according to the present invention includes a case 11A serving as an example of a timepiece main body according to the present invention. A display device such as a liquid crystal display panel is disposed on a front surface of the case 11A, and displays time information. A movement is incorporated in the case 11A. The movement includes a drive unit and a battery (storage battery), and controls display information displayed on the display device.

Bows 12A to 12D are respectively formed in both end portions of the case 11A. An opening portion is formed on a rear surface side of the case 11A. A case back 13 is attached to the opening portion. The case back 13 closes the opening portion. A first band 15A serving as an example of an accessory member and a band according to the present invention is attached to the bows 12A and 12C in one end by using a first pin 14A. A second band 15B is attached to the bows 12B and 12D in the other end by using a second pin 14B. A buckle 16 is disposed in an end portion opposite to a side to which the case 11A is attached in the first band 15A.

An antenna 20 is disposed inside the case 11A. The antenna 20 includes a power receiving coil 21 serving as an example of a power receiving unit according to the present invention, and an electromagnetic shield 22. The power receiving coil 21 is disposed at a position close to the case back 13. Here, a surface opposite to an exposure surface which is exposed outward when the case back 13 is assembled to the case 11A is defined as a rear surface of the case back 13. The power receiving coil 21 is disposed on a surface along the rear surface of the case back 13 which serves as an example of a facing surface according to the present invention. The surface along the rear surface of the case back 13 is substantially parallel to the rear surface of the case back 13.

The power receiving coil 21 has a spiral shape when viewed in a vertical direction. In the following description, an axial direction orthogonal to the rear surface of the case back 13 is referred to as the vertical direction. A central opening portion 21A serving as an example of an opening portion according to the present invention is formed in the center of the power receiving coil 21 when viewed in the vertical direction. An outer edge portion 21B of the power receiving coil 21 is an example of an outer edge portion according to the present invention.

The electromagnetic shield 22 is disposed on a side opposite to the case back 13 across the power receiving coil 21. The electromagnetic shield 22 covers a substantially entire body of the power receiving coil 21. A storage battery (not illustrated) incorporated in the case 11A is mounted on the electromagnetic shield 22.

The electromagnetic shield 22 restrains a magnetic force line passing through the power receiving coil 21 from leaking upward. Power generated in the power receiving coil 21 is supplied to the storage battery. The storage battery stores the supplied power. The power for generating a drive force to drive the drive unit of the movement is supplied to the movement by the storage battery.

The first band 15A is internally equipped with a bypass member 30 serving as an example of a bypass member according to the present invention. The bypass member 30 includes a first bypass 31, a second bypass 32, and a third bypass 33. The first bypass 31 to the third bypass 33 are disposed on a substantially straight line along an extending direction of the first band 15A. The first bypass 31 is disposed between the second bypass 32 and the third bypass 33. The second bypass 32 is disposed on the buckle 16 side of the first bypass 31.

The first bypass 31 has a cylindrical shape which is a circular shape when viewed in the vertical direction. The first bypass 31 is disposed at substantially the center in a width direction of the first band 15A. The second bypass 32 has an arc shape when viewed in the vertical direction. The second bypass 32 is disposed along a direction orthogonal to the extending direction of the first band 15A. The third bypass 33 has an arc shape when viewed in the vertical direction. The third bypass 33 is disposed along the direction orthogonal to the extending direction of the first band 15A. The second bypass 32 and the third bypass 33 are disposed along an arc whose center is the first bypass 31.

A clearance between the first bypass 31 and the second bypass 32 is substantially the same as a clearance between the first bypass 31 and the third bypass 33. The maximum clearance between the second bypass 32 and the third bypass 33 along the extending direction of the first band 15A is substantially the same as a diameter of the power receiving coil 21, or is slightly larger than the diameter of the power receiving coil 21.

All of the first bypass 31, the second bypass 32, and the third bypass 33 are configured to include a soft magnetic material. The soft magnetic material has a weak coercive force and high magnetic permeability. For example, the soft magnetic material can include iron, silicon steel, permalloy (iron-nickel alloy), sendust (iron-silicon-aluminum alloy), permendur (iron-cobalt alloy), soft ferrite (ceramics containing iron oxide as a main component), amorphous magnetic alloy, and nanocrystalline magnetic alloy.

1-2. Charging Mode

Figure 3A:
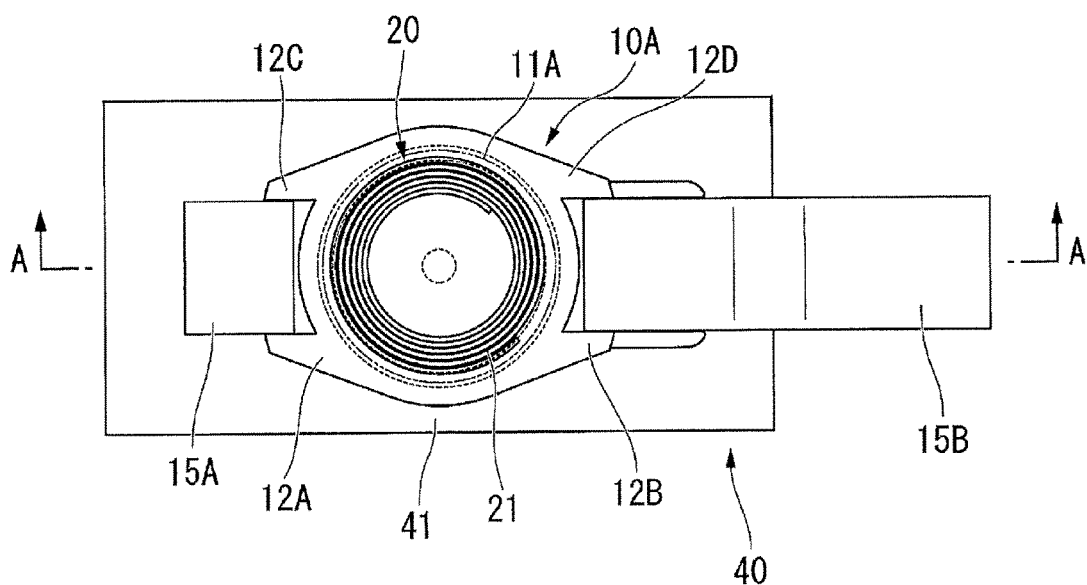
FIG. 3A is a plan view during a charging period of the portable timepiece according to the first embodiment.
Figure 3B:
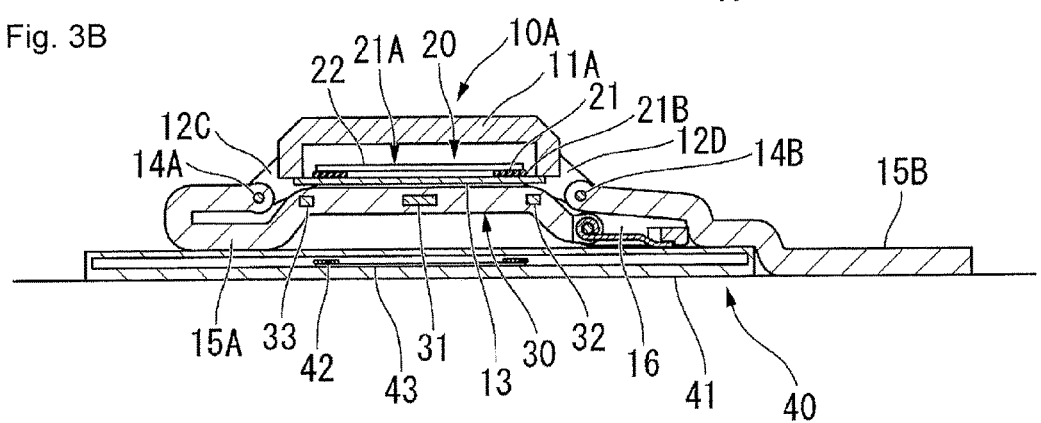
FIG. 3B is a sectional view taken along line A-A in FIG. 3A.

Next, a charging mode for the storage battery incorporated in the case 11A of the portable timepiece 10A will be described. FIG. 3A is a plan view during a charging period of the portable timepiece according to the first embodiment, and FIG. 3B is a sectional view taken along line A-A in FIG. 3A. As illustrated in FIGS. 3A and 3B, during the charging period of the portable timepiece 10A, the portable timepiece 10A is mounted on the charging device 40. In this case, the exposure surface of the case back 13 of the portable timepiece 10A faces the charging device 40.

Herein, the charging device 40 will be described. The charging device 40 includes a box-shaped housing 41. The charging device 40 includes a power supply coil 42. The power supply coil 42 is incorporated into the housing 41. The power supply coil 42 has a shape which is substantially the same as the shape of the power receiving coil 21. The power supply coil 42 has a spiral shape. A central opening portion is formed in the center when the power supply coil 42 is viewed in the vertical direction. The power supply coil 42 is formed along a substantially horizontal plane. A shield member 43 is disposed below the power supply coil 42. The shield member 43 restrains a magnetic force line passing through the power supply coil 42 from leaking downward.

When the portable timepiece 10A is charged, the first band 15A is folded so that the portable timepiece 10A is mounted on the charging device 40. In this case, the surface having the power receiving coil 21 disposed thereon is substantially parallel to the surface having the power supply coil 42 disposed thereon. The first bypass 31 to the third bypass 33 are disposed in the vertical direction between the power receiving coil 21 and the power supply coil 42. When the first band 15A is folded so that charging is performed using the charging device 40, the first band 15A enables the bypass member 30 to be disposed between the power receiving coil 21 and the power supply coil 42 when viewed in the vertical direction. The power supply coil 42 has substantially the same shape as that of the power receiving coil 21. Accordingly, the power receiving coil 21 and the power supply coil 42 are disposed at a position where both of these substantially overlap each other when viewed in the vertical direction.

Specifically, the first bypass 31 is disposed on a lower side of the central opening portion 21A of the power receiving coil 21. The second bypass 32 and the third bypass 33 are disposed on an outer lower side of the outer edge portion 21B of the power receiving coil 21. Therefore, the first bypass 31, the second bypass 32, and the third bypass 33 are disposed at a position where all of these do not overlap the power receiving coil 21 when viewed in the vertical direction.

If the portable timepiece 10A is mounted on the charging device 40, electricity flows to the power supply coil 42 in the charging device 40, and the portable timepiece 10A starts to be charged. If the electricity flows to the power supply coil 42, a magnetic field is generated around the power supply coil 42. If the magnetic field is generated around the power supply coil 42, electromagnetic induction is generated between the power supply coil 42 and the power receiving coil 21 incorporated in the case 11A. The electromagnetic induction generates a current in the power receiving coil 21. The storage battery is charged with the electricity generated by the electricity using the current.

Figure 4A:
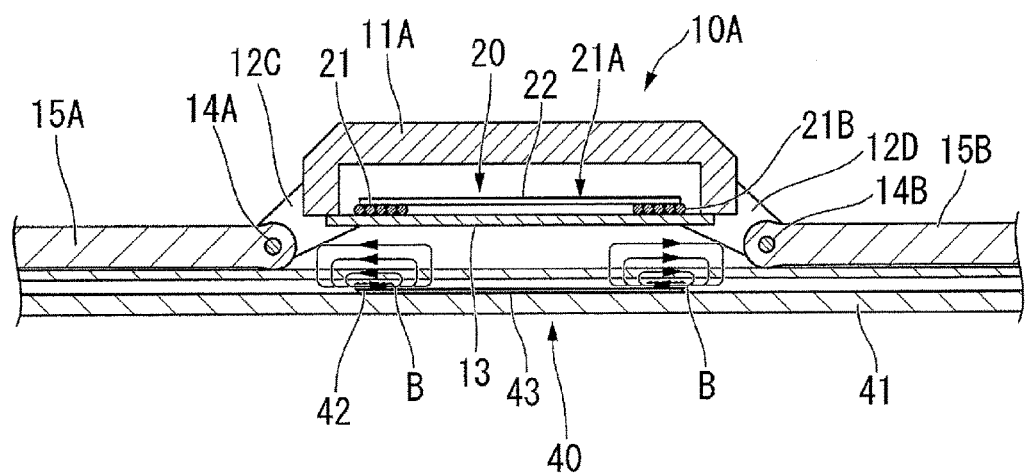
FIG. 4A is a side sectional view of the portable timepiece for describing a magnetic force line in a state where a bypass member is not disposed.

Here, a case is assumed in which the first bypass 31 to the third bypass 33 are not disposed in the vertical direction between the power receiving coil 21 and the power supply coil 42. In this case, as illustrated in FIG. 4A, a magnetic force line B of the magnetic field generated from the power supply coil 42 is short. Therefore, the magnetic field generated from the power supply coil 42 is less likely to reach the power receiving coil 21, and thus, charging efficiency is not so satisfactory.

Figure 4B:
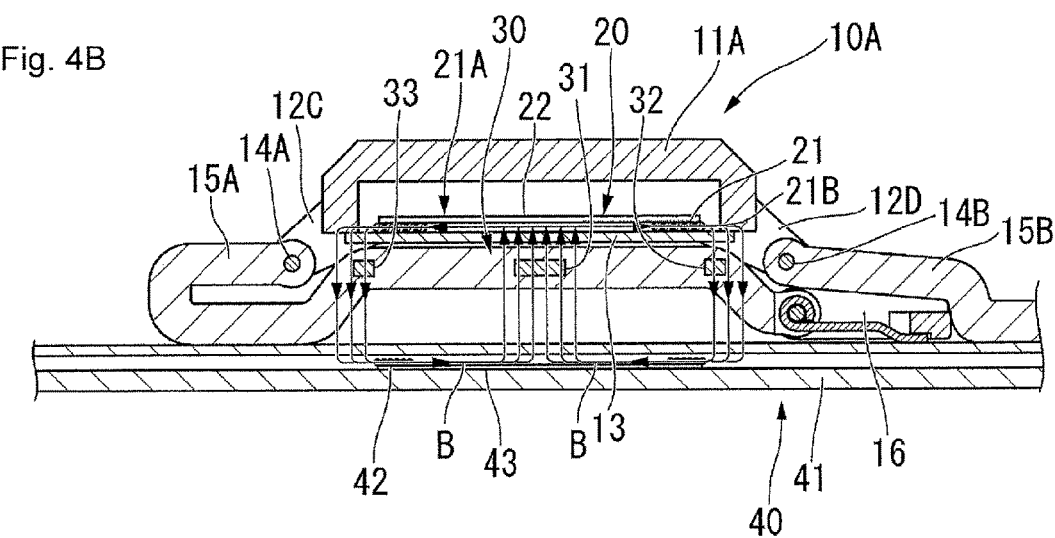
FIG. 4B is a side sectional view of the portable timepiece for describing the magnetic force line in a state where the bypass member is disposed.

In this regard, according to the present embodiment, the first bypass 31 to the third bypass 33 which include the soft magnetic material are disposed in the vertical direction between the power receiving coil 21 and the power supply coil 42. The soft magnetic material included in the first bypass 31 to the third bypass 33 has a weak coercive force and high magnetic permeability. Therefore, as illustrated in FIG. 4B, if the first bypass 31 to the third bypass 33 are disposed between the power receiving coil 21 and the power supply coil 42 when viewed in the vertical direction, the magnetic force line B of the magnetic field generated from the power supply coil 42 becomes longer. Therefore, the magnetic field generated from the power supply coil 42 sufficiently reaches the power receiving coil 21, and thus, the magnetic force line B is sufficiently transmitted to the power receiving coil 21.

As a result, when power is supplied to the charging device 40, the electromagnetic induction is strengthened, and the induced electromotive force generated in the power receiving coil 21 increases. Accordingly, it is possible to increase a current generation amount obtained by the electromagnetic induction in the power receiving coil 21. Therefore, it is possible to improve charging efficiency in charging the storage battery.

The first bypass 31, the second bypass 32, and the third bypass 33 are disposed at a position where all of these do not overlap the power receiving coil 21 when viewed in the vertical direction. Therefore, the electromagnetic induction can be further strengthened between the power receiving coil 21 and the power supply coil 42 when viewed in the vertical direction. Accordingly, it is possible to further improve the charging efficiency in charging the storage battery.

The electromagnetic shield 22 is disposed above the power receiving coil 21, and the shield member 43 is disposed below the power supply coil 42. Therefore, the magnetic force line B is restrained from leaking upward from the power receiving coil 21 and downward from the power supply coil 42. As a result, as illustrated in FIG. 4B, the magnetic force line B passes through the first bypass 31 and the second bypass 32, and clearly draws a line between the power supply coil 42 and the power receiving coil 21. Alternatively, the magnetic force line B passes through the first bypass 31 and the third bypass 33, and clearly draws a line between the power supply coil 42 and the power receiving coil 21. Accordingly, the electromagnetic induction can be further strengthened between the power receiving coil 21 and the power supply coil 42 when viewed in the vertical direction. Therefore, it is possible to further improve the charging efficiency in charging the storage battery.

The first band 15A is internally equipped with the first bypass 31 to the third bypass 33. The first band 15A is deformable so as to dispose the first bypass 31 to the third bypass 33 between the power receiving coil 21 and the power supply coil 42 when viewed in the vertical direction. Therefore, a position relationship relative to the power receiving coil 21 can be easily adjusted by adjusting a folding position of the first band 15A.

Incidentally, the charging device has various types. For example, depending on a type of the charging device, a size or a shape of the power supply coil is different from a size or a shape of the power receiving coil 21 in some cases. In this case, it is conceivable that the power receiving coil 21 and the power supply coil are in a state where both of these are less likely to be close to each other. A position for disposing the first bypass 31 to the third bypass 33 can be easily adjusted by adjusting the folding position of the first band 15A in the portable timepiece 10A. Accordingly, even in a case where the power receiving coil 21 and the power supply coil are not close to each other, the bypass member 30 can be easily disposed between the power receiving coil 21 and the power supply coil. Accordingly, even in a case where various chargers are used for charging, it is possible to improve charging efficiency in non-contact charging.

The first band 15A internally equipped with the bypass member 30 is attached to the case 11A. Therefore, when the non-contact charging is performed using the power receiving coil 21 accommodated in the case 11A, there is very little chance that the bypass member 30 is not provided. Accordingly, it is possible to restrain a situation where charging cannot be efficiently performed by disposing the bypass member 30 between the power receiving coil 21 and the power supply coil 42 when viewed in the vertical direction.

According to the present embodiment, as the bypass member 30, three bypasses such as the first bypass 31 to the third bypass 33 are provided. However, the bypass member may include one bypass. Alternatively, two, four, or more bypasses may be included therein. The bypass member 30 is arranged on the lower side of the central opening portion 21A of the power receiving coil 21 and the outer lower side of the outer edge portion 21B of the power receiving coil 21. However, the bypass member 30 may be disposed on only the lower side of the central opening portion 21A of the power receiving coil 21 or on only the outer lower side of the outer edge portion 21B of the power receiving coil 21. The bypass member 30 is disposed at the position where the bypass member 30 does not overlap the power receiving coil 21 when viewed in the vertical direction. However, the bypass member 30 may be disposed at a position where the bypass member 30 partially overlaps the power receiving coil 21 when viewed in the vertical direction.

Second Embodiment

Next, a second embodiment according to the present invention will be described.

2-1. Configuration of Portable Timepiece

Figure 5A:
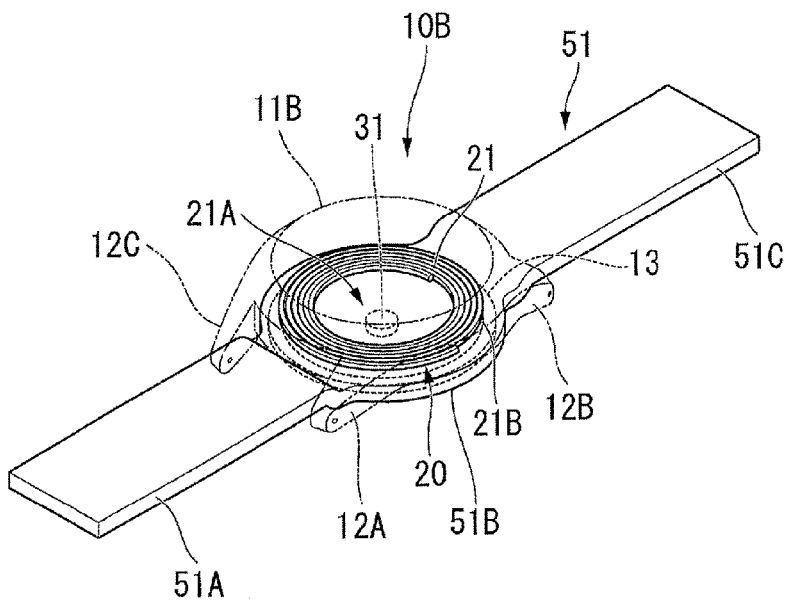
FIG. 5A is a perspective view of a portable timepiece according to a second embodiment.
Figure 5B:
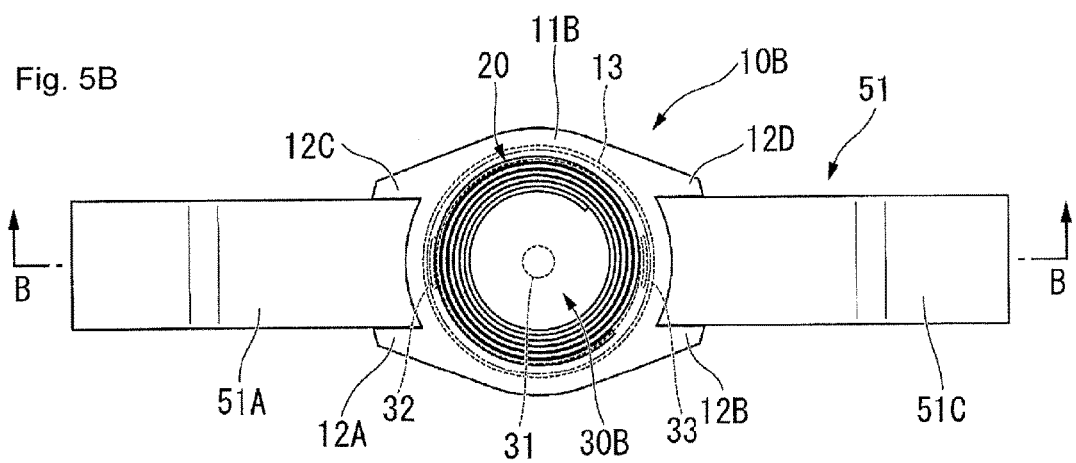
FIG. 5B is a plan view during a charging period of the portable timepiece according to the second embodiment.
Figure 5C:
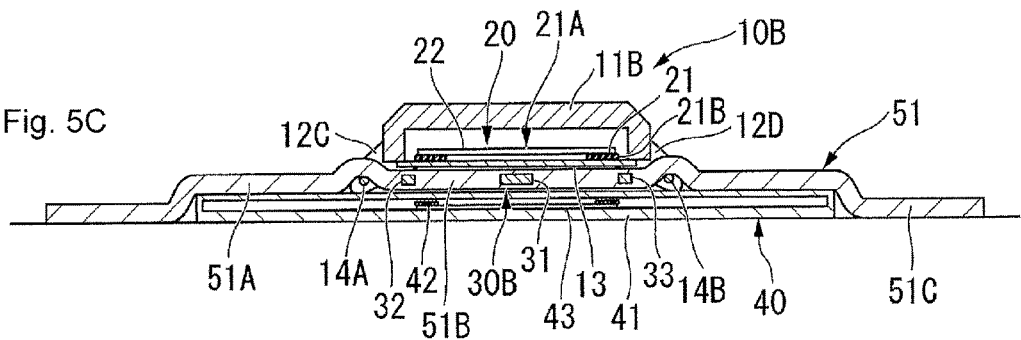
FIG. 5C is a sectional view taken along line B-B in FIG. 5B.

FIG. 5A is a perspective view of a portable timepiece according to the second embodiment, FIG. 5B is a plan view during a charging period of the portable timepiece according to the second embodiment, and FIG. 5C is a sectional view taken along line B-B in FIG. 5B. As illustrated in FIGS. 5A to 5C, a portable timepiece 10B includes a case 11B. A display device is disposed in the case 11B. A movement is incorporated in the case 11B. An antenna 20 is disposed in the case 11B. The antenna 20 includes the power receiving coil 21 and the electromagnetic shield 22. The central opening portion 21A is formed in the center of the power receiving coil 21. The outer edge portion 21B is formed in the power receiving coil 21. The antenna 20 is common to the antenna 20 described in the first embodiment.

The bows 12A to 12D are respectively formed in both end portions of the case 11B. The case back 13 is attached to the opening portion on the rear surface side of the case 11B. The first pin 14A is disposed in the bow 12A and the bow 12C in one end of the case 11B. The second pin 14B is disposed in the bow 12B and the bow 12D in the other end of the case 11B. A pulling band 51 serving as an example of the pulling band and the accessory member according to the present invention is pulled on the rear surface side of the case 11B. The pulling band 51 is inserted between the first pin 14A and the case 11B. The pulling band 51 is also inserted between the second pin 14B and the case 11B.

The pulling band 51 includes a first band portion 51A, a second band portion 51B, and a third band portion 51C. The first band portion 51A is a portion located opposite to the case 11B from the first pin 14A in the pulling band 51. The second band portion 51B is a portion located between the first pin 14A and the second pin 14B in the pulling band 51. The second band portion 51B is disposed on the rear side of the case 11B. The third band portion 51C is a portion located opposite to the case 11B from the second pin 14B in the pulling band 51.

The second band portion 51B is internally equipped with a bypass member 30B. The bypass member 30B includes the first bypass 31, the second bypass 32, and the third bypass 33. The first bypass 31, the second bypass 32, and the third bypass 33 have a size and layout which are common to those according to the first embodiment. When being charged, the portable timepiece 10B is mounted on the charging device 40. The charging device 40 includes the housing 41, the power supply coil 42, and the shield member 43. The charging device 40 is common to that described in the first embodiment.

2-2. Charging Mode

In the portable timepiece 10B according to the second embodiment, similarly to the first embodiment, during a charging period, the first bypass 31 to the third bypass 33 including the soft magnetic material are disposed between the power receiving coil 21 and the power supply coil 42 when viewed in the vertical direction. Therefore, the magnetic force line of the magnetic field generated from the power supply coil 42 is sufficiently transmitted to the power receiving coil 21. Accordingly, it is possible to increase a current generation amount obtained by the electromagnetic induction in the power receiving coil 21. Therefore, it is possible to improve charging efficiency in charging the storage battery.

The first bypass 31, the second bypass 32, and the third bypass 33 are disposed at a position where all of these do not overlap the power receiving coil 21 when viewed in the vertical direction. Therefore, the electromagnetic induction can be further strengthened between the power receiving coil 21 and the power supply coil 42 when viewed in the vertical direction. Accordingly, it is possible to further improve the charging efficiency in charging the storage battery.

According to the present embodiment, the second band portion 51B serving as a portion of the pulling band 51 and disposed on the rear side of the case 11B is internally equipped with the first bypass 31 to the third bypass 33. Therefore, only if the case 11B is mounted on the charging device 40, the first bypass 31 to the third bypass 33 can be disposed at a position where all of these do not overlap the power receiving coil 21 when viewed in the vertical direction. Accordingly, even in a case where various chargers are used for charging, it is possible to improve charging efficiency in non-contact charging.

Third Embodiment

Next, a third embodiment according to the present invention will be described.

3-1. Configuration of Portable Timepiece

Figure 6A:
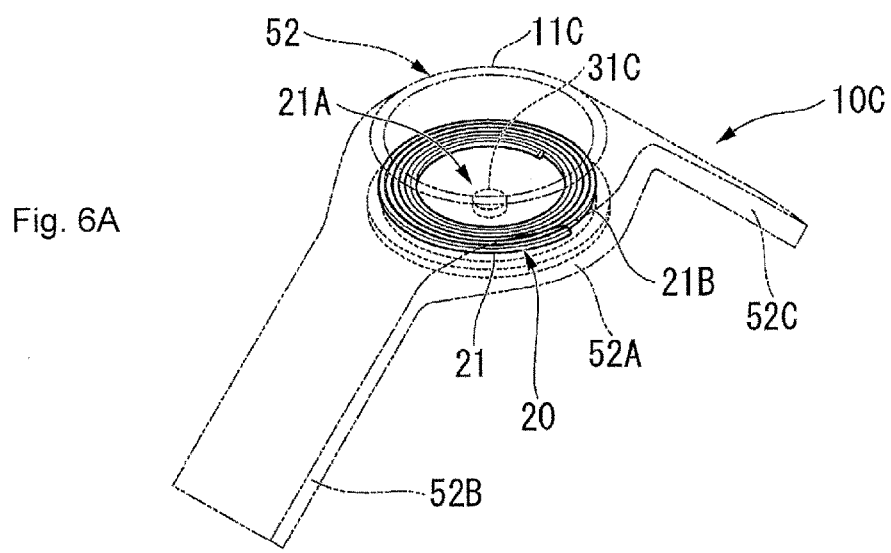
FIG. 6A is a perspective view of a portable timepiece according to a third embodiment.
Figure 6B:
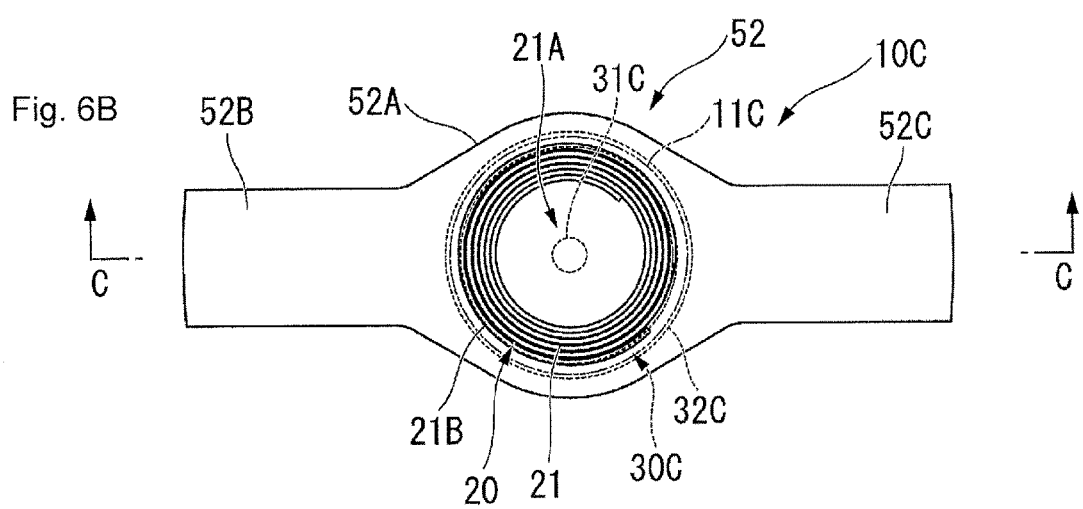
FIG. 6B is a plan view during a charging period of the portable timepiece according to the third embodiment.
Figure 6C:
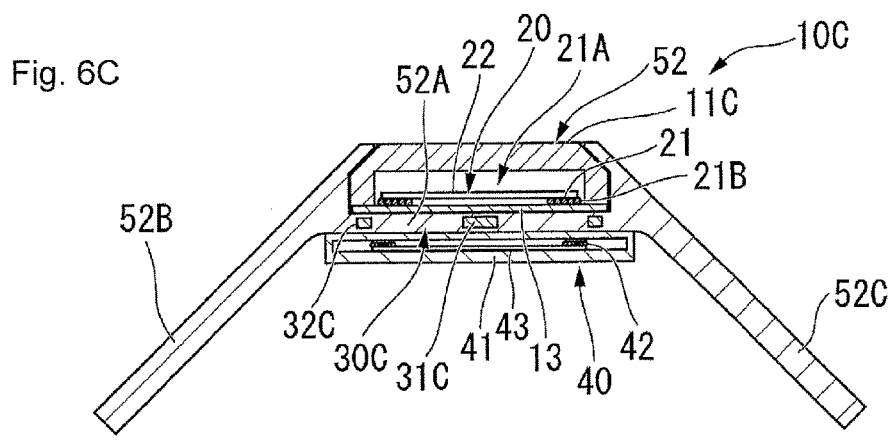
FIG. 6C is a sectional view taken along line C-C in FIG. 6B.

FIG. 6A is a perspective view of a portable timepiece according to the third embodiment, FIG. 6B is a plan view during a charging period of the portable timepiece according to the third embodiment, and FIG. 6C is a sectional view taken along line C-C in FIG. 6B. As illustrated in FIGS. 6A to 6C, a portable timepiece 10C includes a case 11C. A display device is disposed in the case 11C. A movement is incorporated in the case 11C. An antenna 20 is disposed in the case 11C. The antenna 20 includes the power receiving coil 21 and the electromagnetic shield 22. The central opening portion 21A is formed in the center of the power receiving coil 21. The outer edge portion 21B is formed in the power receiving coil 21. The antenna 20 is common to the antenna 20 described in the first embodiment.

The case 11C is attached to a jacket band 52 serving as an example of the accessory member according to the present invention. The jacket band 52 includes a main body accommodation unit 52A. The case 11C is accommodated in the main body accommodation unit 52A. In the main body accommodation unit 52A, a first band 52B and a second band 52C which serve as an example of the accessory band according to the present invention are disposed integrally with the main body accommodation unit 52A.

A bottom surface portion of the main body accommodation unit 52A is internally equipped with a bypass member 30C. The bypass member 30C includes a first bypass 31C and a second bypass 32C. The bottom surface portion of the main body accommodation unit 52A is internally equipped with the first bypass 31C and the second bypass 32C. The first bypass 31C has a size and layout which are the same as common to those according to the first embodiment. The second bypass 32C has a ring shape. The second bypass 32C is disposed along an outer periphery of the power receiving coil 21 when viewed in the vertical direction. When being charged, the main body accommodation unit 52A of the portable timepiece 10C is mounted on the charging device 40. The charging device 40 includes the housing 41, the power supply coil 42, and the shield member 43. The charging device 40 is common to that described in the first embodiment.

3-2. Charging Mode

In the portable timepiece 10C according to the third embodiment, during a charging period, the first bypass 31C and the second bypass 32C which include the soft magnetic material are disposed between the power receiving coil 21 and the power supply coil 42 when viewed in the vertical direction. Therefore, similarly to the first embodiment, the magnetic force line of the magnetic field generated from the power supply coil 42 is sufficiently transmitted to the power receiving coil 21. Accordingly, it is possible to increase a current generation amount obtained by the electromagnetic induction in the power receiving coil 21. Therefore, it is possible to improve charging efficiency in charging the storage battery.

The first bypass 31C and the second bypass 32C are disposed at a position where both of these do not overlap the power receiving coil 21 when viewed in the vertical direction. Therefore, the electromagnetic induction can be further strengthened between the power receiving coil 21 and the power supply coil 42 when viewed in the vertical direction. Accordingly, it is possible to further improve the charging efficiency in charging the storage battery.

The bottom surface portion of the main body accommodation unit 52A in the jacket band 52 is internally equipped with the first bypass 31C and the second bypass 32C. Therefore, only if the main body accommodation unit 52A of the jacket band 52 is mounted on the charging device 40, the first bypass 31C and the second bypass 32C can be disposed at a position where both of these do not overlap the power receiving coil 21 when viewed in the vertical direction. Accordingly, even in a case where various chargers are used for charging, it is possible to improve charging efficiency in non-contact charging.

Fourth Embodiment

Next, a fourth embodiment according to the present invention will be described.

4-1. Configuration of Portable Timepiece

FIG. 7A is a plan view of a portable timepiece according to the fourth embodiment, and FIG. 7B is a side view of the portable timepiece according to the fourth embodiment. FIG. 8A is a plan view during a charging period of the portable timepiece according to the fourth embodiment, FIG. 8B is a sectional view taken along line D-D in FIG. 8A, and FIG. 8C is a sectional view taken along line E-E in FIG. 8A. As illustrated in FIGS. 7A and 7B, a portable timepiece 10D includes a box-shaped case 11D. A display device is disposed in the case 11D. A movement is incorporated in the case 11D. An antenna 20 is disposed in the case 11D. The antenna 20 includes the power receiving coil 21 and the electromagnetic shield 22. The antenna 20 is common to the antenna 20 described in the first embodiment.

The bows 12A to 12D are respectively formed in both end portions of the case 11D. A first band 53A is attached to the bows 12A and 12C in one end. A second band 53B serving as an example of the band according to the present invention is attached to the bows 12B and 12D in the other end. A free ring 54 serving as an example of the accessory member according to the present invention is attached to the second band 53B. The free ring 54 surrounds a portion of the second band 53B. A buckle 55 is attached to a side opposite to a side to which the case 11D is attached in the second band 53B. The buckle 55 includes a buckle main body 55A and a buckle tongue 55B. Multiple adjustment holes 56, 56, and more which are separated at substantially equal intervals along the extending direction are formed in the first band 53A. The first band 53A and the second band 53B are connected to each other in such a way that the first band 53A is inserted into the buckle main body 55A of the buckle 55. The first band 53A and the second band 53B are fixed to each other in such a way that the buckle tongue 55B is inserted into any one of the adjustment holes 56, 56, and more.

A bypass member 30D is disposed in the second band 53B and the free ring 54. The bypass member 30D includes first bypasses 31D1 to 31D8 internally equipped in the second band 53B. The bypass member 30D includes second bypasses 32D1 to 32D3 and third bypasses 33D1 to 33D3, all of which are equipped in the free ring 54.

The first bypasses 31D1 to 31D8 are disposed in a substantially central portion in the width direction in the second band 53B so as to be separated at substantially equal intervals in the extending direction of the second band 53B. The second bypasses 32D1 to 32D3 are disposed in one end portion on the outer side from the second band 53B in the free ring 54 when viewed in the vertical direction. The second bypasses 32D1 to 32D3 are disposed at substantially equal intervals in the extending direction of the second band 53B. A clearance between the second bypasses 32D1 to 32D3 is shorter than a clearance between the first bypasses 31D1 to 31D8.

The third bypasses 33D1 to 33D3 are disposed in the other end portion on the outer side from the second band 53B in the free ring 54 when viewed in the vertical direction. The third bypasses 33D1 to 33D3 are disposed at substantially equal intervals in the extending direction of the second band 53B. A clearance between the third bypasses 33D1 to 33D3 is shorter than a clearance between the second bypasses 32D1 to 32D3.

As illustrated in FIGS. 8A to 8C, when being charged, the portable timepiece 10D is mounted on the charging device 40. The charging device 40 includes the housing 41, the power supply coil 42, and the shield member 43. The charging device 40 is common to that described in the first embodiment. In the portable timepiece 10D, the second band 53B when being charged is folded in a portion of the bows 12B and 12D. The free ring 54 is movable along the extending direction of the second band 53B. A position of the free ring 54 is adjusted when the portable timepiece 10D is mounted on the charging device 40. In this case, the free ring 54 is disposed below the antenna 20.

4-2. Charging Mode

In the portable timepiece 10D according to the fourth embodiment, during a charging period, any one of the first bypasses 31D1 to 31D8 including the soft magnetic material is disposed between the power receiving coil 21 and the power supply coil 42 when viewed in the vertical direction. In an example illustrated in FIG. 8A to 8C, the first bypasses 31D3, the second bypasses 32D1 to 32D3, and the third bypasses 33D1 to 33D3 are disposed between the power receiving coil 21 and the power supply coil 42 when viewed in the vertical direction. Therefore, the magnetic force line of the magnetic field generated from the power supply coil 42 is sufficiently transmitted to the power receiving coil 21. Accordingly, it is possible to increase a current generation amount obtained by the electromagnetic induction in the power receiving coil 21. Therefore, it is possible to improve charging efficiency in charging the storage battery.

According to the present embodiment, the free ring 54 is internally equipped with the second bypasses 32D1 to 32D3 and the third bypasses 33D1 to 33D3. Therefore, during a charging period, it is possible to finely adjust each layout position of the second bypasses 32D1 to 32D3 and the third bypasses 33D1 to 33D3. A substantially central portion in the width direction of the second band 53B is internally equipped with the first bypasses 31D1 to 31D8. Accordingly, any one of the first bypasses 31D1 to 31D8 can be easily disposed in the opening portion on the inner side of the power receiving coil 21. Accordingly, even in a case where various chargers are used for charging, it is possible to improve charging efficiency in non-contact charging.

Fifth Embodiment

Next, a fifth embodiment according to the present invention will be described.

5-1. Configuration of Portable Timepiece

Figure 10A:
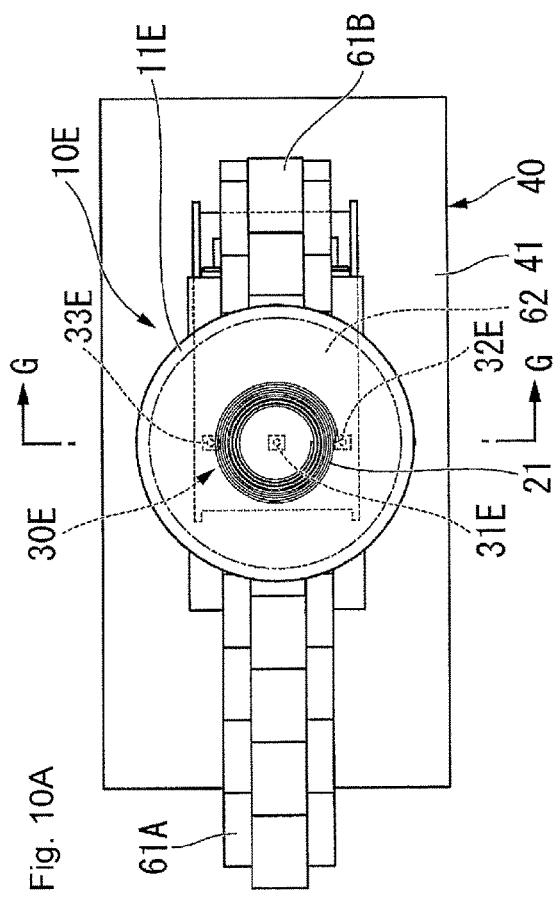
FIG. 10A is a plan view during a charging period of the portable timepiece according to the fifth embodiment.
Figure 10B:
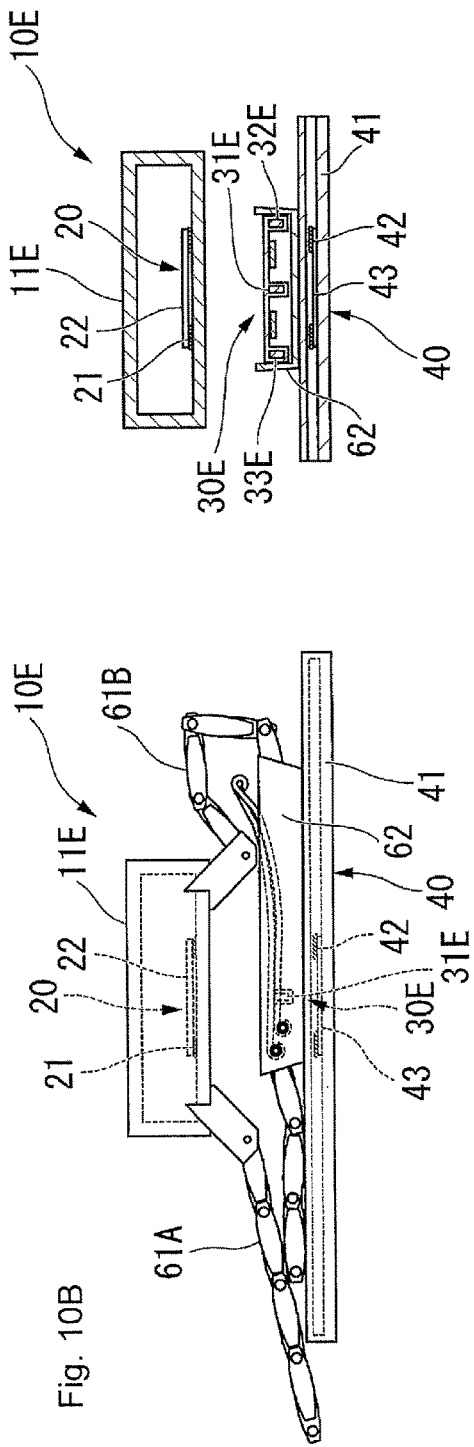
FIG. 10B is a side view during a charging period of the portable timepiece according to the fifth embodiment.
Figure 10C:
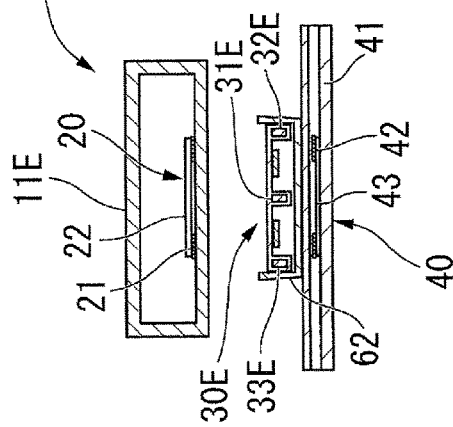
FIG. 10C is a sectional view taken along line G-G in FIG. 10A.

FIG. 9A is a plan view of a portable timepiece according to the fifth embodiment, and FIG. 9B is a side view of the portable timepiece according to the fifth embodiment. FIG. 10A is a plan view during a charging period of the portable timepiece according to the fifth embodiment, FIG. 10B is a side view during a charging period of the portable timepiece according to the fifth embodiment, and FIG. 10C is a sectional view taken along line G-G in FIG. 10A. As illustrated in FIGS. 9A and 9B, a portable timepiece 10E includes a case 11E. A display device is disposed in the case 11E. A movement is incorporated in the case 11E. An antenna 20 is disposed in the case 11E. The antenna 20 includes the power receiving coil 21 and the electromagnetic shield 22. The central opening portion 21A is formed in the center of the power receiving coil 21. The outer edge portion 21B is formed in the power receiving coil 21. The antenna 20 is common to the antenna 20 described in the first embodiment.

The bows 12A to 12D are respectively formed in both end portions of the case 11E. The first pin 14A is disposed in the bow 12A and the bow 12C in one end of the case 11E. The second pin 14B is disposed in the bow 12B and the bow 12D in the other end of the case 11E. A connection target band 61A is attached to the bow 12A and the bow 12C in one end of the case 11E. A connection band 61B is attached to the bow 12B and the bow 12D in the other end of the case 11E.

A clasp 62 serving as an example of the accessory member according to the present invention is attached to the connection band 61B. The clasp 62 is connected to a side opposite to a side connected to the case 11E in the connection target band 61A. The clasp 62 connects the connection target band 61A and the connection band 61B to each other. The clasp 62 is internally equipped with a bypass member 30E. The bypass member 30E includes a first bypass 31E, a second bypass 32E, and a third bypass 33E. The first bypass 31E is disposed in substantially central portion in the width direction of the clasp 62. The second bypass 32E is disposed on one end side in the width direction of the clasp 62 when viewed from the first bypass 31E. The third bypass 33E is disposed on the other end side in the width direction of the clasp 62 when viewed from the first bypass 31E. The first bypass 31E, the second bypass 32E, and the third bypass 33E are arrayed on one straight line along the width direction of the clasp 62.

When being charged, the portable timepiece 10E is mounted on the charging device 40 as illustrated in FIGS. 10A to 10C. The charging device 40 includes the housing 41, the power supply coil 42, and the shield member 43. The charging device 40 is common to that described in the first embodiment. The connection band 61B is folded at an intermediate position thereof. In this manner, the first bypass 31E in the clasp 62 is disposed on a lower side of the central opening portion 21A of the power receiving coil 21. The second bypass 32E and the third bypass 33E are respectively disposed on an outer lower side of the outer edge portion 21B of the power receiving coil 21.

5-2. Charging Mode

In the portable timepiece 10E according to the fifth embodiment, during a charging period, the first bypass 31E to the third bypass 33E including the soft magnetic material are disposed between the power receiving coil 21 and the power supply coil 42 when viewed in the vertical direction. Therefore, similarly to the first embodiment, the magnetic force line of the magnetic field generated from the power supply coil 42 is sufficiently transmitted to the power receiving coil 21. Accordingly, it is possible to increase a current generation amount obtained by the electromagnetic induction in the power receiving coil 21. As a result, it is possible to improve charging efficiency in charging the storage battery.

According to the present embodiment, the clasp 62 attached to the connection band 61B is internally equipped with the first bypass 31E to the third bypass 33E. Therefore, since the connection band 61B is properly folded, the first bypass 31E to the third bypass 33E can be easily disposed at a position where the power receiving coil 21 and the power supply coil 42 do not overlap each other when viewed in the vertical direction. Accordingly, even in a case where various chargers are used for charging, it is possible to improve charging efficiency in non-contact charging.

Sixth Embodiment

Next, a sixth embodiment according to the present invention will be described.

6-1. Configuration of Portable Timepiece

Figure 11A:
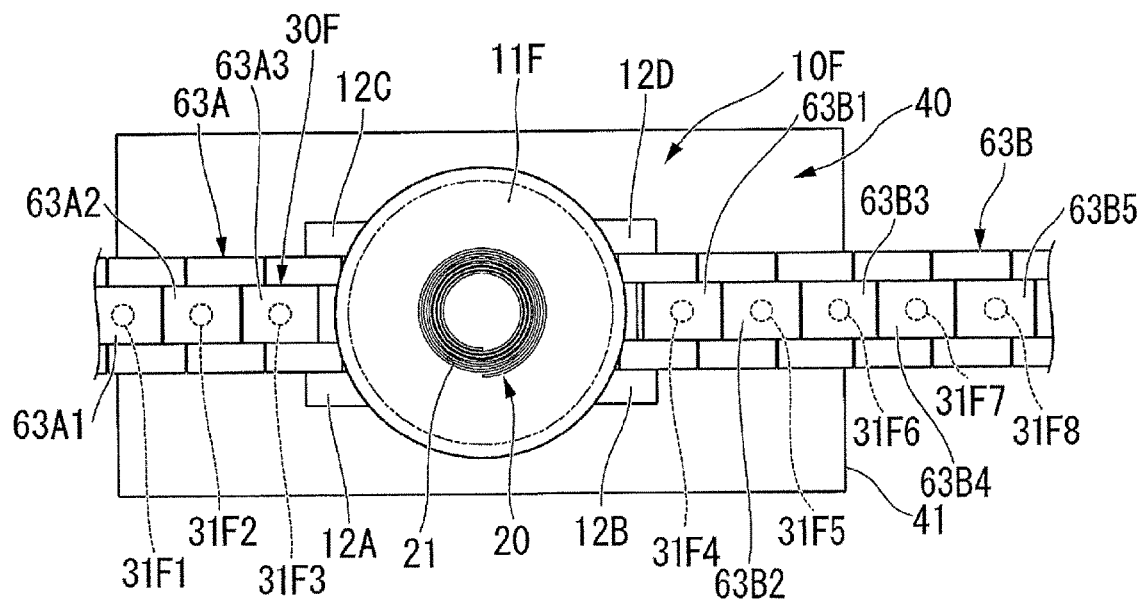
FIG. 11A is a plan view of a portable timepiece according to a sixth embodiment.
Figure 11B:
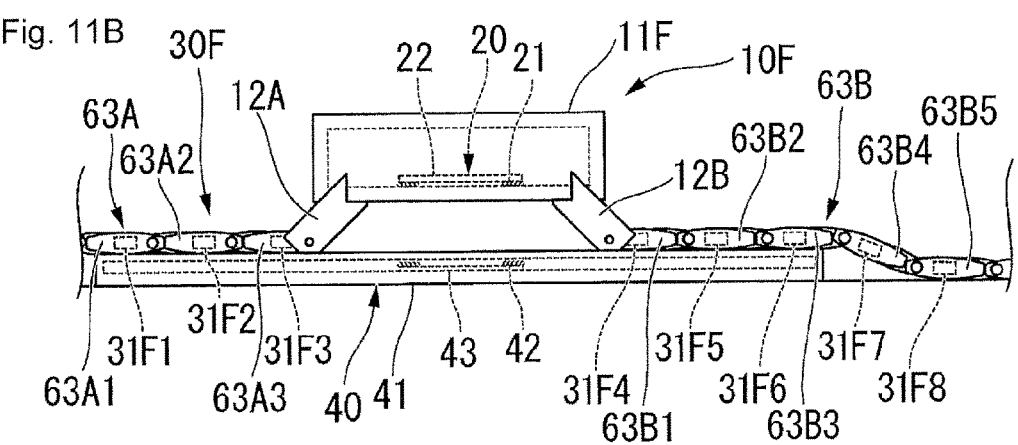
FIG. 11B is a side view of the portable timepiece according to the sixth embodiment.
Figure 12A:
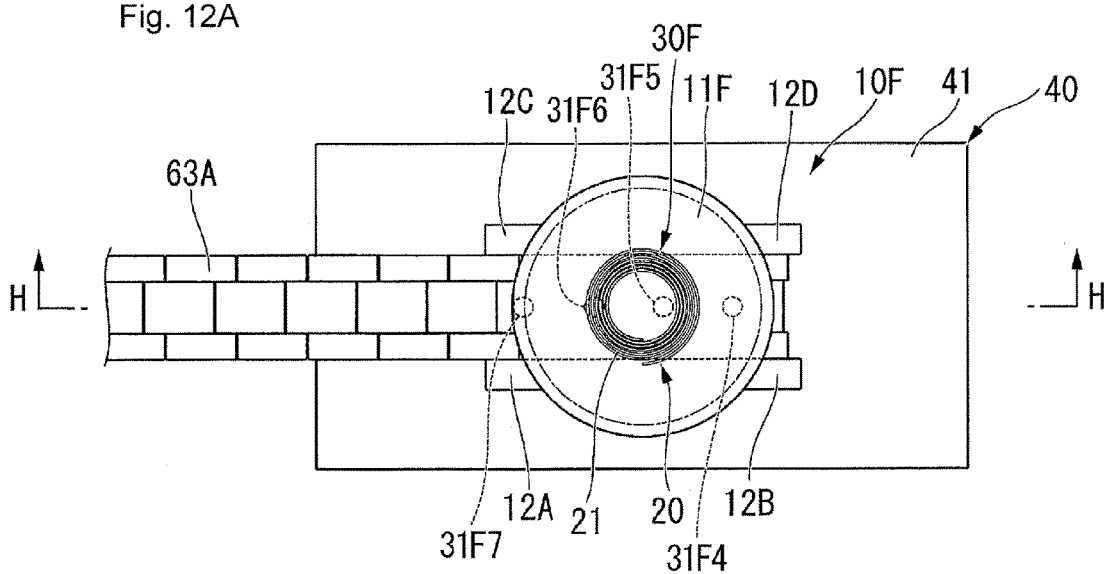
FIG. 12A is a plan view during a charging period of the portable timepiece according to the sixth embodiment.
Figure 12B:
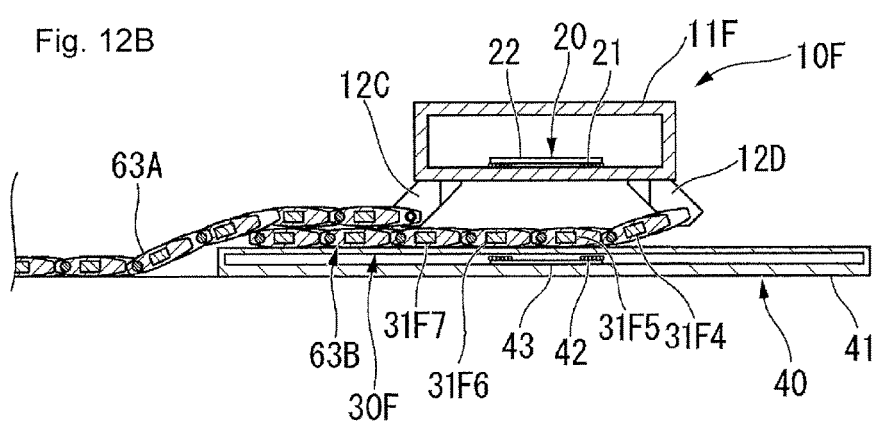
FIG. 12B is a sectional view taken along line H-H in FIG. 12A.

FIG. 11A is a plan view of a portable timepiece according to the sixth embodiment, and FIG. 11B is a side view of the portable timepiece according to the sixth embodiment. FIG. 12A is a plan view during a charging period of the portable timepiece according to the sixth embodiment, and FIG. 12B is a sectional view taken along line H-H in FIG. 12A. As illustrated in FIGS. 11A and 11B, a portable timepiece 10F includes a case 11F. A display device is disposed in the case 11F. A movement is incorporated in the case 11F. An antenna 20 is disposed in the case 11F. The antenna 20 includes the power receiving coil 21 and the electromagnetic shield 22. The antenna is common to the antenna 20 described in the first embodiment.

The bows 12A to 12D are respectively formed in both end portions of the case 11F. A first block connection band 63A serving as an example of the accessory member and the block connection band according to the present invention is attached to the bows 12A and 12C in one end. A second block connection band 63B serving as an example of the accessory member and the block connection band according to the present invention is attached to the bows 12B and 12D in the other end. The first block connection band 63A and the second block connection band 63B configure a block connection band in which multiple band blocks are connected to one another.

The first block connection band 63A and the second block connection band 63B are internally equipped with a bypass member 30F. A first band first block 63A1 to a first band third block 63A3 of the first block connection band 63A are respectively and internally equipped with a first bypass 31F1 to a third bypass 31F3. A second band first block 63B1 to a second band fifth block 63B5 of the second block connection band 63B are respectively and internally equipped with a fourth bypass 31F4 to an eighth bypass 31F8.

The bypass is also disposed in the other band blocks of the first block connection band 63A and the second block connection band 63B. The band blocks in the first block connection band 63A and the second block connection band 63B are disposed on one straight line along the extending direction of the first block connection band 63A and the second block connection band 63B. The first bypass 31F1 to the eighth bypass 31F8 are respectively disposed in the central portion in the width direction of the first band first block 63A1 to the first band third block 63A3 and the second band first block 63B1 to the second band fifth block 63B5. The first bypass 31F1 to the eighth bypass 31F8 are respectively disposed on one straight line along the extending direction of the first block connection band 63A and the second block connection band 63B. When being charged, the portable timepiece 10F is mounted on the charging device 40. The charging device 40 includes the housing 41, the power supply coil 42, and the shield member 43. The charging device 40 is common to that described in the first embodiment.

6-2. Charging Mode

In the portable timepiece 10F according to the sixth embodiment, during a charging period, the first bypass 31F1 to the eighth bypass 31F8 including the soft magnetic material are disposed between the power receiving coil 21 and the power supply coil 42 when viewed in the vertical direction. Therefore, the magnetic force line of the magnetic field generated from the power supply coil 42 is sufficiently transmitted to the power receiving coil 21. Accordingly, it is possible to increase a current generation amount obtained by the electromagnetic induction in the power receiving coil 21. Therefore, it is possible to improve charging efficiency in charging the storage battery.

In some cases, in the vicinity of the power receiving coil 21, the first bypass 31F1 to the eighth bypass 31F8 illustrated in FIGS. 11A and 11B are disposed at a position where the power receiving coil 21 and the power supply coil 42 do not overlap each other, and at the other position. Specifically, as illustrated in FIG. 12B, the fourth bypass 31F4 and the seventh bypass 31F7 are disposed on the outer lower side of the outer edge portion 21B of the power receiving coil 21. The fifth bypass 31F5 is disposed on the lower side of the central opening portion 21A of the power receiving coil 21. In contrast, the sixth bypass 31F6 is disposed at a position other than the lower side of the central opening portion 21A of the power receiving coil 21 and the outer lower side of the outer edge portion 21B. Even in this case, the fourth bypass 31F4 and the fifth bypass 31F5 are disposed at a position where the power receiving coil 21 and the power supply coil 42 do not overlap each other when viewed in the vertical direction. Therefore, it is possible to improve charging efficiency in charging the storage battery. Accordingly, even in a case where various chargers are used for charging, it is possible to improve charging efficiency in non-contact charging.

Seventh Embodiment

Figure 13:
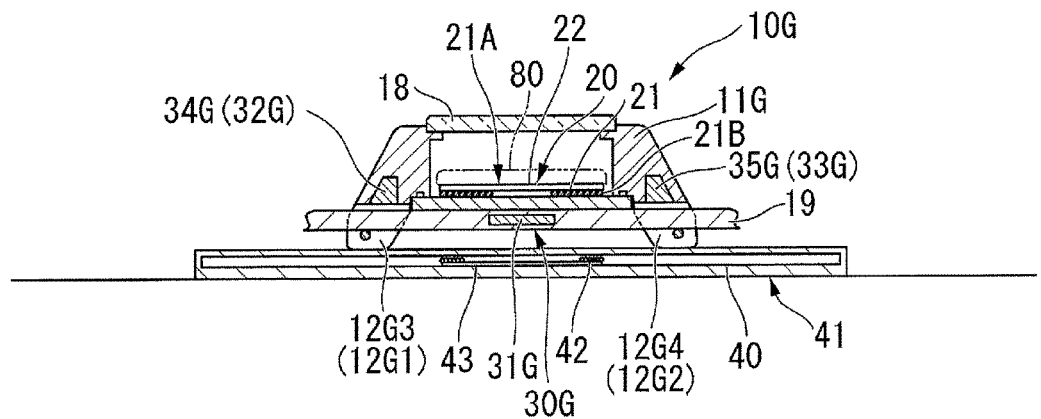
FIG. 13 is a side sectional view of a portable timepiece according to a seventh embodiment.

Next, a seventh embodiment according to the present invention will be described.
7-1. Configuration of Portable Timepiece
FIG. 13 is a side sectional view of a portable timepiece according to the seventh embodiment. As illustrated in FIG. 13, a portable timepiece 10G includes a case 11G. A windshield glass 18 is disposed in the case 11G. A movement (not illustrated) is incorporated in the case 11G. An antenna 20 is disposed in the case 11G. The antenna 20 includes the power receiving coil 21 and the electromagnetic shield 22. The central opening portion 21A is formed in the center of the power receiving coil 21. The outer edge portion 21B is formed in the power receiving coil 21. The antenna 20 is common to the antenna 20 described in the first embodiment. A storage battery 80 is mounted on the antenna 20.

A first bow 12G1 to a fourth bow 12G4 which serve as an example of the accessory member and the bow according to the present invention are respectively disposed at four corners on the rear surface side of the case 11G. Any one of the first bow 12G1 to the fourth bow 12G4 is disposed outward from the outer edge portion 21B of the power receiving coil 21. Any one of the first bow 12G1 to the fourth bow 12G4 has the same shape. In FIG. 13, the first bow 12G1 is located at the front position of the third bow 12G3. The second bow 12G2 is located at the front position of the fourth bow 12G4. A pulling band 19 is pulled between the first bow 12G1 and the third bow 12G3 in one end. The pulling band 19 is also pulled between the second bow 12G2 and the fourth bow 12G4 in the other end.

A bypass member 30G is disposed in the pulling band 19 and the first bow 12G1 to the fourth bow 12G4. The bypass member 30G includes a first bypass 31G to a fifth bypass 35G. The first bypass 31G is internally equipped in the lower side of the central opening portion 21A of the power receiving coil 21 in the pulling band 19. The second bypass 32G to the fifth bypass 35G are respectively disposed in the first bow 12G1, the second bow 12G2, the third bow 12G3, and the fourth bow 12G4 in the case 11G. Any one of the second bypass 32G, the third bypass 33G, the fourth bypass 34G, and the fifth bypass 35G has the same shape. In FIG. 13, the second bypass 32G is located at the front position of the fourth bypass 34G. The third bypass 33G is located at the front position of the fifth bypass 35G.

When being charged, the portable timepiece 10G is mounted on the charging device 40. The charging device 40 includes the housing 41, the power supply coil 42, and the shield member 43. The charging device 40 is common to that described in the first embodiment.
7-2. Charging Mode
In the portable timepiece 10G according to the seventh embodiment, during a charging period, the first bypass 31G to the fifth bypass 35G including the soft magnetic material are disposed between the power receiving coil 21 and the power supply coil 42 when viewed in the vertical direction. Therefore, similarly to the first embodiment, the magnetic force line of the magnetic field generated from the power supply coil 42 is sufficiently transmitted to the power receiving coil 21. Accordingly, it is possible to increase a current generation amount obtained by the electromagnetic induction in the power receiving coil 21. As a result, it is possible to improve charging efficiency in charging the storage battery.

According to the present embodiment, the first bypass 31G is internally equipped on the lower side of the central opening portion 21A of the power receiving coil 21 in the pulling band 19. Therefore, only if the case 11G is mounted on the charging device 40, the first bypass 31G can be disposed at a position where the first bypass 31G does not overlap the power receiving coil 21 when viewed in the vertical direction. Accordingly, even in a case where various chargers are used for charging, it is possible to improve charging efficiency in non-contact charging.

The second bypass 32G to the fifth bypass 35G are disposed across the lower side and the upper side of the power receiving coil 21, outward from the outer edge portion 21B of the power receiving coil 21. Even in this case, a portion of the second bypass 32G to the fifth bypass 35G is disposed on the outer lower side of the outer edge portion 21B of the power receiving coil 21. Therefore, the magnetic force line of the magnetic field generated from the power supply coil 42 can be easily transmitted to the power receiving coil 21. As a result, it is possible to improve charging efficiency in charging the storage battery.

Eighth Embodiment

Figure 14:
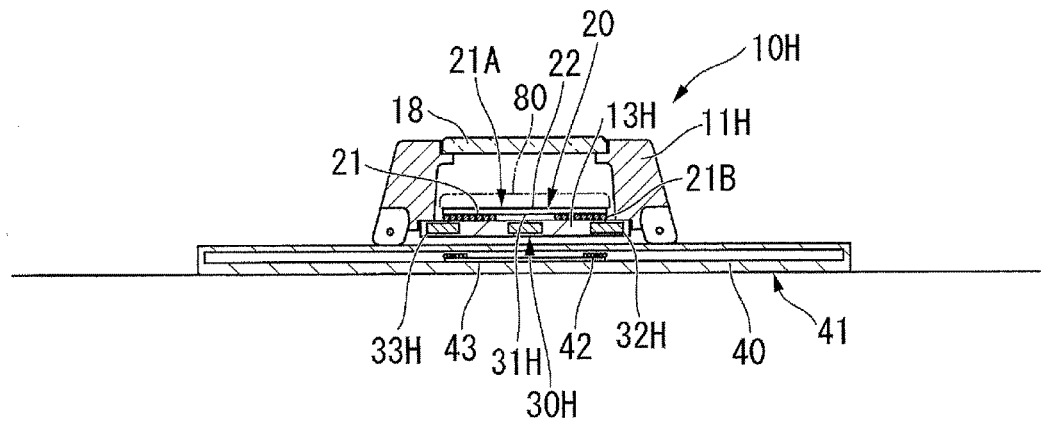
FIG. 14 is a side sectional view of a portable timepiece according to an eighth embodiment.

Next, an eighth embodiment according to the present invention will be described.
8-1. Configuration of Portable Timepiece
FIG. 14 is a side sectional view of a portable timepiece according to the eighth embodiment. As illustrated in FIG. 14, a portable timepiece 10H includes a case 11H. The windshield glass 18 is disposed in the case 11H. A movement (not illustrated) is incorporated in the case 11H. An antenna 20 is disposed in the case 11H. The antenna 20 includes the power receiving coil 21 and the electromagnetic shield 22. The central opening portion 21A is formed in the center of the power receiving coil 21. The outer edge portion 21B is formed in the power receiving coil 21. The antenna 20 is common to the antenna 20 described in the first embodiment. The storage battery 80 is mounted on the antenna 20.

A case back 13H serving as an example of the accessory member according to the present invention is attached to the opening portion on the rear surface side of the case 11H. The case back 13H closes the opening portion on the rear surface side of the case 11H. The case back 13H is internally equipped with a bypass member 30H. The bypass member 30H includes a first bypass 31H, a second bypass 32H, and a third bypass 33H. The first bypass 31H is disposed on the lower side of the central opening portion 21A of the power receiving coil 21. The second bypass 32H and the third bypass 33H are disposed on the outer lower side of the outer edge portion 21B of the power receiving coil 21.

When being charged, the portable timepiece 10H is mounted on the charging device 40. The charging device 40 includes the housing 41, the power supply coil 42, and the shield member 43. The charging device 40 is common to that described in the first embodiment.

8-2. Charging Mode

In the portable timepiece 10H according to the eighth embodiment, during a charging period, the first bypass 31H to the third bypass 33H including the soft magnetic material are disposed between the power receiving coil 21 and the power supply coil 42 when viewed in the vertical direction. Therefore, similarly to the first embodiment, the magnetic force line of the magnetic field generated from the power supply coil 42 is sufficiently transmitted to the power receiving coil 21. Accordingly, it is possible to increase a current generation amount obtained by the electromagnetic induction in the power receiving coil 21. As a result, it is possible to improve charging efficiency in charging the storage battery.

According to the present embodiment, the case back 13H is internally equipped with the first bypass 31H to the third bypass 33H. Therefore, only if the case 11H is mounted on the charging device 40, the first bypass 31H to the third bypass 33H can be disposed at a position where all of these do not overlap the power receiving coil 21 when viewed in the vertical direction. Accordingly, even in a case where various chargers are used for charging, it is possible to improve charging efficiency in non-contact charging.

Ninth Embodiment

Next, a ninth embodiment according to the present invention will be described.

9-1. Configuration of Portable Timepiece

Figure 15A:
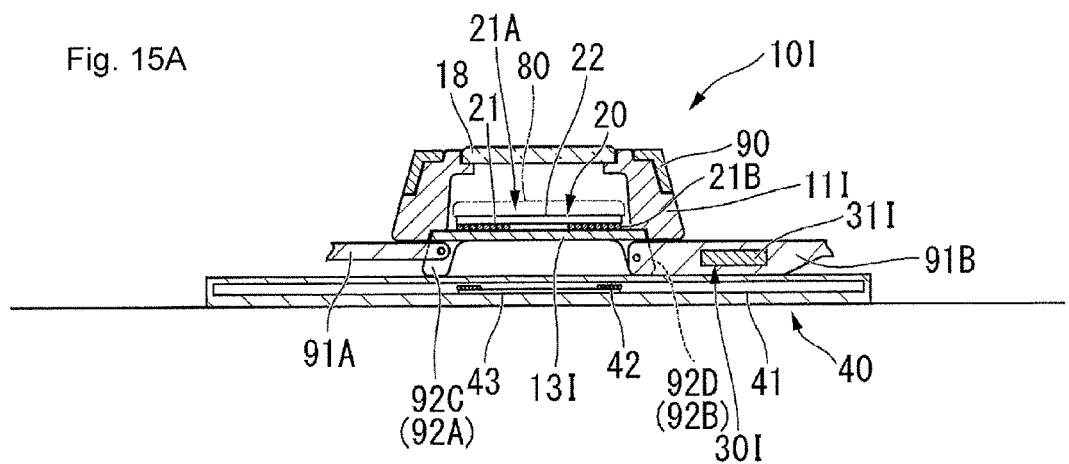
FIG. 15A is a side sectional view of a portable timepiece according to a ninth embodiment.
Figure 15B:
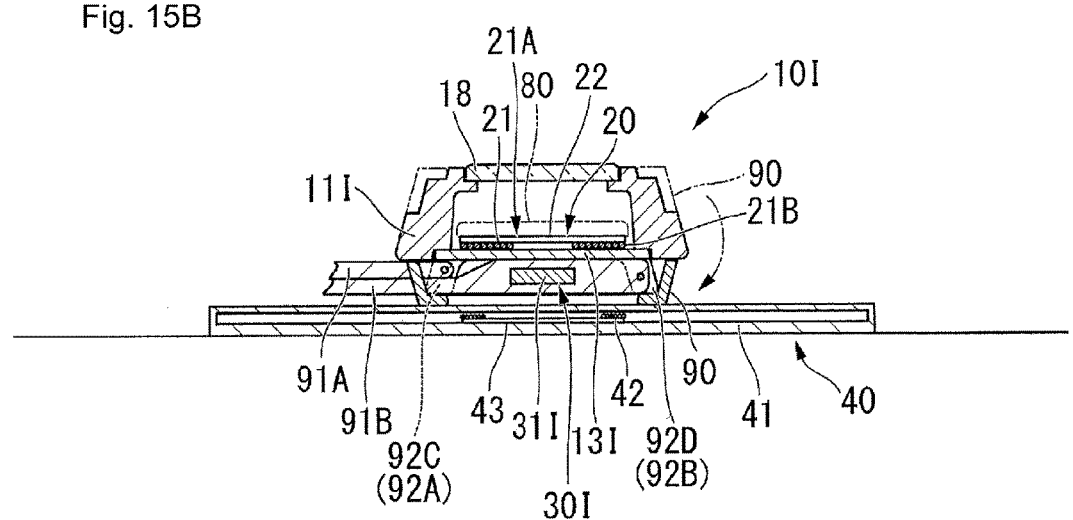
FIG. 15B is a side sectional view illustrating a charging period of the portable timepiece according to the ninth embodiment.

FIG. 15A is a side sectional view of a portable timepiece according to the ninth embodiment, and FIG. 15B is a side sectional view illustrating a charging period of the portable timepiece according to the ninth embodiment. As illustrated in FIG. 15A, a portable timepiece 10I includes a case 11I. The windshield glass 18 is disposed in the case 11I. A movement (not illustrated) is incorporated in the case 11I. An antenna 20 is disposed in the case 11I. The antenna 20 includes the power receiving coil 21 and the electromagnetic shield 22. The central opening portion 21A is formed in the center of the power receiving coil 21. The outer edge portion 21B is formed in the power receiving coil 21. The antenna 20 is common to the antenna 20 described in the first embodiment. The storage battery 80 is mounted on the antenna 20.

Cutout portions are respectively formed at four corners of the upper surface portion of the case 11I. A decorative member 90 serving as an example of the accessory member according to the present invention is attached to these corners. The decorative member 90 has a shape which surrounds the windshield glass 18 when viewed in the vertical direction. The cutout portion formed in the upper surface portion of the case 11I has a shape which can be fitted to the decorative member 90. The decorative member 90 is attachable to and detachable from the upper surface portion which is a portion of the case 11I (timepiece main body) excluding the rear surface side. The portion of the case 11I excluding the rear surface side may be a portion other than the upper surface portion. For example, the portion of the case 11I excluding the rear surface side may be a side surface portion of the case 11I. In addition, the portion of the case 11I excluding the rear surface side may be a portion formed across the upper surface portion and the side surface portion of the case 11I.

A case back 13I is attached to the opening portion on the rear side of the case M. A first band 91A and a second band 91B are disposed below the case back 13I. A first bow 92A, a second bow 92B, a third bow 92C, and a fourth bow 92D are respectively disposed at four corners on the rear surface side of the case back 13I. Any one of the first bow 92A to the fourth bow 92D has the same shape. In FIG. 15, the first bow 92A is located at the front position of the third bow 92C, and the second bow 92B is located at the front position of the fourth bow 92D.

The first band 91A is attached to the first bow 92A and the third bow 92C in one end. The second band 91B is attached to the second bow 92B and the fourth bow 92D in the other end. As a whole, the first bow 92A to the fourth bow 92D respectively have a shape which can be fitted to the decorative member 90. The decorative member 90 is attachable to and detachable from the first bow 92A to the fourth bow 92D on the rear surface side of the case 11I.

The second band 91B is foldable around an axis of the second bow 92B and the fourth bow 92D. The folded second band 91B is interposed between the first bow 92A and the third bow 92C. The second band 91B is fixed to a portion between the first bow 92A and the third bow 92C in such a way that the decorative member 90 is fitted into the first bow 92A to the fourth bow 92D.

The portable timepiece 10I includes a bypass member 30I. The bypass member 30I includes a first bypass 31I and the decorative member 90. The second band 91B is internally equipped with the first bypass 31I. When the second band 91B is fixed to the portion between the first bow 92A and the third bow 92C, the first bypass 31I is disposed on the lower side of the central opening portion in the power receiving coil 21. The decorative member 90 is configured to include the soft magnetic material. Therefore, the decorative member 90 configures a portion of the bypass member.

9-2. Charging Mode

In the portable timepiece 10I according to the ninth embodiment, during a charging period, the decorative member 90 is attached to the first bow 92A to the fourth bow 92D disposed in the case 11I. In this case, the first bypass 31I internally equipped in the second band 91B is disposed on the lower side of the central opening portion 21A in the power receiving coil 21. The decorative member 90 is disposed on the outer lower side of the outer edge portion 21B in the power receiving coil 21. The decorative member 90 is configured to include the soft magnetic material, and has a function as a bypass member. Therefore, the magnetic force line of the magnetic field generated from the power supply coil 42 is sufficiently transmitted to the power receiving coil 21. Accordingly, it is possible to increase a current generation amount obtained by the electromagnetic induction in the power receiving coil 21. As a result, it is possible to improve charging efficiency in charging the storage battery.

The decorative member 90 is a member for fixing the second band 91B to the portion between the first bow 92A and the third bow 92C. In this manner, in the portable timepiece 10I according to the present embodiment, the decorative member 90 is also utilized as a bypass member. Therefore, charging efficiency can be improved without increasing a separate bypass member, and the present embodiment can contribute to the reduced number of components.

According to the present embodiment, the decorative member 90 is formed of the soft magnetic material, but may be formed of other materials such as a resin. In this case, the decorative member itself does not function as the bypass member. Therefore, it is preferable that a soft magnetic material functioning as the bypass member is internally equipped in the decorative member formed of a material other than the soft magnetic material.

The present invention is not limited to the embodiments described above with reference to the drawings, and various modification examples are conceivable within the technical scope of the present invention.

In the respective embodiments, an example has been described in which the portable timepieces 10A to 10I are employed as the portable device. However, as long as the portable device includes a charging antenna, the portable device is not limited to the portable timepieces 10A to 10I. Accordingly, for example, the present invention is also applicable to other portable devices such as a heart rate monitor and a body composition meter.

Alternatively, within the scope not departing from the gist of the present invention, the configuration elements in the above-described embodiments can be appropriately replaced with known configuration elements.

What is claimed is:

1. A portable device comprising:
   a case;
   a power receiving unit accommodated in the case, wherein the power receiving unit includes an annular coil having a void area in a center thereof and a radius measured from the center to an outermost of the annular coil;
   a plurality of bypass members made of a soft magnetic material; and
   a belt rotatably connected to the case and folded to lie under the case, wherein the plurality of bypass members are arranged in the belt along a length of the belt, and relative distances among the plurality of bypass members and locations of the plurality of bypass members along the belt are defined such that one of the plurality of bypass members is located within a first imaginary tube extending through the void area in a thickness direction of the case, and another of the plurality of bypass member is located outside a second imaginary tube extending in the thickness direction of the case and having the radius to surround the annular coil.

2. The portable device according to claim 1,
   wherein the power receiving unit includes a power receiving coil that is disposed on a surface along a facing surface which faces the charging device in the case, and that has an opening portion formed in the center, and
   wherein when the charging is performed using the charging device, the accessory member enables the bypass member to be disposed at a position where the bypass member and the power receiving unit do not overlap each other when viewed in an axial direction orthogonal to the facing surface.

3. The portable device according to claim 2,
   wherein the accessory member enables the bypass member to be disposed in the opening portion formed in the center of the power receiving coil and an outer edge portion of the power receiving coil.

4. A portable timepiece comprising:
   a timepiece main body;
   a power receiving unit accommodated in the timepiece body on a rear surface side of the timepiece main body, wherein the power receiving unit includes an annular coil having a void area in a center thereof and a radius measured from the center to an outermost of the annular coil;
   a plurality of bypass members made of a soft magnetic material; and
   a belt rotatably attached to the timepiece main body and folded to lie under the timepiece main body, wherein the plurality of bypass members are arranged in the belt along a length of the belt, and relative distances among the plurality of bypass members and locations of the plurality of bypass members along the belt are defined such that one of the plurality of bypass members is located within a first imaginary tube extending through the void area in a thickness direction of the timepiece main body, and another of the plurality of bypass member is located outside a second imaginary tube extending in the thickness direction of the timepiece main body and having the radius to surround the annular coil.

5. The portable timepiece according to claim 4,
   wherein the accessory member is a pulling band that is pulled to a rear surface side in the timepiece main body, and that is internally equipped with the bypass member on a rear side of the timepiece main body.

6. The portable timepiece according to claim 4,
   wherein the accessory member is a jacket band including a main body accommodation unit that accommodates the timepiece main body and that is internally equipped with the bypass member, and an accessory band that is disposed in the main body accommodation unit.

7. The portable timepiece according to claim 4,
   wherein the accessory member is a free ring attached to a band so as to be movable along the band attached to the timepiece main body.

8. The portable timepiece according to claim 4,
   wherein the accessory member is a clasp that is disposed in a connection band attached to the timepiece main body, and that connects the connection band to a connection target band attached to the timepiece main body.

9. The portable timepiece according to claim 4,
   wherein the accessory member is a block connection band in which multiple band blocks are connected to each other and the band block is internally equipped with the bypass member.

10. The portable timepiece according to claim 4,
    wherein the accessory member is a bow disposed in the timepiece main body.

11. The portable timepiece according to claim 4,
    wherein the accessory member is a case back that closes an opening on a rear surface side of the timepiece main body.

12. The portable timepiece according to claim 4,
    wherein the accessory member is a decorative member that is attachable to and detachable from each of a rear surface side of the timepiece main body and a portion of the timepiece main body, which excludes the rear surface side.

13. The portable timepiece according to claim 4,
    wherein the power receiving unit includes a power receiving coil that is disposed on a surface along a facing surface which faces the charging device in the timepiece main body, and that has an opening portion formed in the center, and
    wherein when the charging is performed using the charging device, the accessory member enables the bypass member to be disposed at a position where the bypass member and the power receiving unit do not overlap each other when viewed in an axial direction orthogonal to the facing surface.

14. The portable timepiece according to claim 13, wherein the accessory member enables the bypass member to be disposed in the opening portion formed in the center of the power receiving coil and an outer edge portion of the power receiving coil.

\* \* \* \* \*